(12) United States Patent
Wagner

(10) Patent No.: US 12,263,053 B2
(45) Date of Patent: Apr. 1, 2025

(54) BYPASS FLOW ASSEMBLY OF AN ORAL IRRIGATOR

(71) Applicant: WATER PIK, INC., Fort Collins, CO (US)

(72) Inventor: Robert D. Wagner, Firestone, CO (US)

(73) Assignee: WATER PIK, INC., Fort Collins, CO (US)

( * ) Notice: Subject to any disclaimer, the term of this patent is extended or adjusted under 35 U.S.C. 154(b) by 621 days.

(21) Appl. No.: 17/370,420

(22) Filed: Jul. 8, 2021

(65) Prior Publication Data

US 2022/0023019 A1 Jan. 27, 2022

Related U.S. Application Data

(60) Provisional application No. 63/126,000, filed on Dec. 16, 2020, provisional application No. 63/055,117, filed on Jul. 22, 2020.

(51) Int. Cl.
| | | |
|---|---|---|
| *A61C 17/02* | (2006.01) | |
| *A61H 13/00* | (2006.01) | |
| *F04B 49/24* | (2006.01) | |

(52) U.S. Cl.
CPC ........... *A61C 17/02* (2013.01); *A61H 13/005* (2013.01); *F04B 49/24* (2013.01)

(58) Field of Classification Search
CPC ........ A61C 17/02–032; A61M 39/1055; F04B 49/24–246
See application file for complete search history.

(56) References Cited

U.S. PATENT DOCUMENTS

| | | | | |
|---|---|---|---|---|
| 3,590,813 A | * | 7/1971 | Roszyk | A61C 1/0092 601/162 |
| 4,108,167 A | * | 8/1978 | Hickman | F04B 17/03 601/162 |
| 4,182,354 A | * | 1/1980 | Bergstedt | F16K 31/363 137/115.03 |
| 4,951,713 A | * | 8/1990 | Jordan | B01F 25/311 239/428 |

(Continued)

FOREIGN PATENT DOCUMENTS

| | | |
|---|---|---|
| CN | 1488445 | 4/2004 |
| CN | 205073056 | 3/2016 |

(Continued)

*Primary Examiner* — Edward Moran
*Assistant Examiner* — Matthew P Saunders

(57) ABSTRACT

A bypass flow assembly of an oral irrigator is provided. The oral irrigator may include a handle positionable between a first mode and a second mode and a valve assembly including a bypass valve movable between first and second positions and an inlet valve movable between open and closed positions. The first position of the bypass valve may be associated with the first mode of the handle and the second position of the bypass valve may be associated with the second mode of the handle, such that the bypass valve moves from the first position to the second position when the handle is positioned in the second mode and remains in the second position until the handle is positioned in the first mode. The inlet valve may move between the open and closed positions when the bypass valve is positioned in the first position and the second position.

13 Claims, 18 Drawing Sheets

(56) References Cited

U.S. PATENT DOCUMENTS

| | | | | |
|---|---|---|---|---|
| 5,086,975 | A * | 2/1992 | Paige | B08B 3/026 |
| | | | | 92/167 |
| 6,334,458 | B1 * | 1/2002 | Amaduzzi | F04B 49/24 |
| | | | | 137/115.06 |
| 6,988,488 | B2 * | 1/2006 | Pursifull | F02M 55/002 |
| | | | | 123/514 |
| 2004/0209222 | A1 * | 10/2004 | Snyder | A61C 17/0202 |
| | | | | 601/162 |
| 2007/0203439 | A1 * | 8/2007 | Boyd | A61C 17/02 |
| | | | | 601/165 |
| 2010/0261134 | A1 * | 10/2010 | Boyd | A61C 19/02 |
| | | | | 433/80 |
| 2010/0261137 | A1 * | 10/2010 | Boyd | A61C 17/028 |
| | | | | 433/88 |
| 2010/0266980 | A1 * | 10/2010 | Boyd | A61C 17/0202 |
| | | | | 433/84 |
| 2010/0330527 | A1 * | 12/2010 | Boyd | A61C 17/0205 |
| | | | | 433/82 |
| 2011/0097683 | A1 * | 4/2011 | Boyd | A61H 13/005 |
| | | | | 433/77 |
| 2015/0072303 | A1 | 3/2015 | Boyd et al. | |
| 2015/0147717 | A1 | 5/2015 | Taylor et al. | |
| 2018/0168785 | A1 * | 6/2018 | Wagner | A61C 17/0217 |
| 2018/0296307 | A1 * | 10/2018 | Boyd | A61C 1/0084 |

FOREIGN PATENT DOCUMENTS

| | | |
|---|---|---|
| CN | 110267623 | 9/2019 |
| CN | 215875040 | 2/2022 |
| DE | 3801097 | 7/1989 |
| WO | 9319697 | 10/1993 |

* cited by examiner

BYPASS FLOW ASSEMBLY OF AN ORAL IRRIGATOR

CROSS-REFERENCE TO RELATED APPLICATIONS

This application claims the benefit of priority pursuant to 35 U.S.C. § 119(e) of U.S. Provisional Patent Application No. 63/055,117, filed Jul. 22, 2020, titled "Bypass Flow Assembly of an Oral Irrigator" and U.S. Provisional Patent Application No. 63/126,000, filed Dec. 16, 2020, titled "Bypass Flow Assembly of an Oral Irrigator," both of which are hereby incorporated by reference herein in their entireties.

TECHNICAL FIELD

One or more embodiments of the present disclosure relate generally to oral cleansing devices and more particularly, for example, to a bypass flow assembly of an oral irrigator.

BACKGROUND

Some oral irrigators include a pause mode limiting or restricting fluid flow through a handle to pause oral irrigation. While the pause mode may limit or stop fluid flow through the handle, the oral irrigator (e.g., a motor or pump) may continue to run. To allow continued operation of the oral irrigator while flow through the handle is paused, some oral irrigators may include a bypass assembly allowing fluid to bleed-off or bypass under pressure. Conventional bypass assemblies may increase operation noise and wear of the oral irrigator as the fluid must be pressurized for the bypass assembly to operate.

Therefore, there is a need in the art for a bypass flow assembly for an oral irrigator that addresses the deficiencies noted above, other deficiencies known in the industry, or at least offers an alternative to current techniques.

SUMMARY

According to one or more embodiments of the present disclosure, an oral irrigator is provided. The oral irrigator may include a handle positionable between a first mode and a second mode, and a valve assembly including a bypass valve movable between first and second positions and an inlet valve movable between open and closed positions. The first position of the bypass valve may be associated with the first mode of the handle and the second position of the bypass valve may be associated with the second mode of the handle, such that the bypass valve moves from the first position to the second position when the handle is positioned in the second mode and remains in the second position until the handle is positioned in the first mode. The inlet valve may move between the open and closed positions when the bypass valve is positioned in the first position and the second position.

According to one or more embodiments of the present disclosure, a pump assembly for an oral irrigator is provided. The pump assembly may include an inlet, an outlet, a bypass flow circuit, and a valve assembly. The valve assembly may include a bypass valve and an inlet valve. The bypass valve may be movable between a first position directing fluid between the inlet and the outlet and a second position directing fluid through the bypass flow circuit. The inlet valve may be movable between open and closed positions when the bypass valve is positioned in the first position and the second position.

According to one or more embodiments of the present disclosure, a method for controlling fluid flow through an oral irrigator including a handle, a bypass valve movable between first and second positions, and an inlet valve movable between open and closed positions is provided. The method may include holding the bypass valve in the first position when the handle is in a first mode of operation, holding the bypass valve in the second position when the handle is in a second mode of operation, and permitting the inlet valve to move between the open and closed positions when the bypass valve is positioned in the first position and the second position.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the oral irrigator described herein and should not be construed as a complete depiction of the scope of the oral cleansing device.

Embodiments of the disclosure and their advantages are best understood by referring to the detailed description that follows. It should be appreciated that like reference numerals may be used to identify like elements illustrated in one or more of the figures.

DETAILED DESCRIPTION

According to the present disclosure, a bypass flow assembly of an oral irrigator is provided. The oral irrigator includes a handle positionable between a first mode and a second mode. The first mode may be an operation mode permitting fluid to flow through the handle for oral irrigation. The second mode may be a pause mode limiting or restricting fluid flow through the handle.

The oral irrigator includes a valve assembly. The valve assembly includes a bypass valve movable between first and second positions depending on the mode of the handle. For instance, the bypass valve may be positioned in the first position when the handle is in the first mode permitting fluid to flow through the handle. The bypass valve may move to the second position when the handle switches to the second mode limiting or restricting fluid flow through the handle. When the bypass valve is in the second position, fluid may flow through a bypass flow circuit of the oral irrigator to limit or alleviate pressure build-up while the oral irrigator continues to run. The bypass valve may remain in the second position until the handle is positioned in the first mode. When the handle is switched back to the first mode, the bypass valve may move back to the first position to allow pressure build-up within the oral irrigator to pressurize the handle for oral irrigation.

The valve assembly also includes an inlet valve movable between open and closed positions. In the open position, the inlet valve may permit fluid to be drawn into the valve assembly from a fluid reservoir under a vacuum stroke of a pump or piston. In the closed position, the inlet valve may limit or restrict reverse fluid flow to the fluid reservoir under a compression stroke of the pump or piston. The inlet valve may move between the open and closed positions when the bypass valve is positioned in the first position and the second position. For example, irrespective of the position of the bypass valve (and the mode of the handle), the inlet valve may move between the open and closed positions with movement of the pump or piston.

Figure 1:
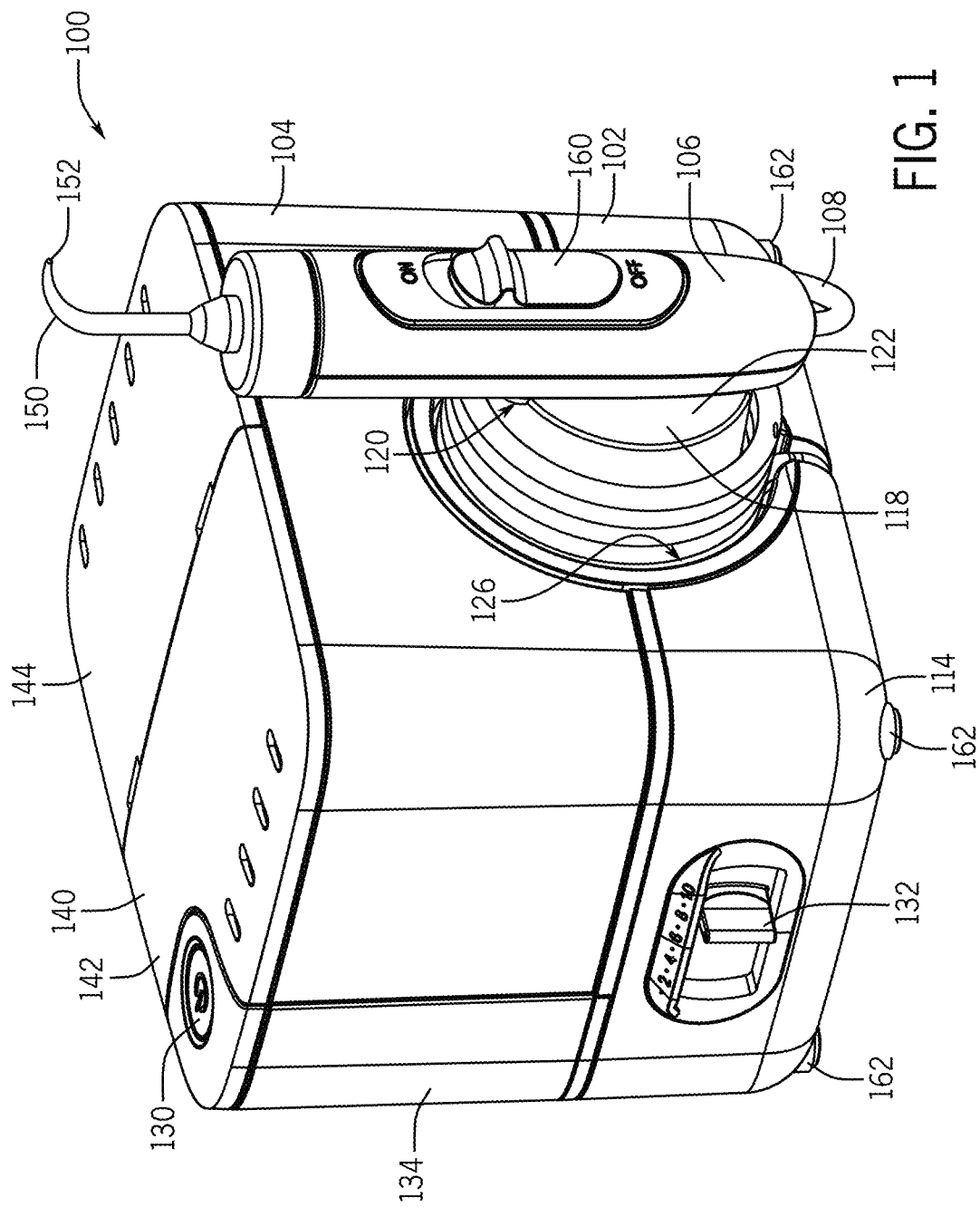
FIG. 1 illustrates an isometric view of an oral irrigator in accordance with an embodiment of the disclosure.

FIG. 1 illustrates an isometric view of an oral irrigator 100 in accordance with an embodiment of the disclosure. The oral irrigator 100 may include many configurations operable to pressurize fluid (e.g., water) and deliver the pressurized fluid to irrigate or spray fluid into a user's mouth. As shown, the oral irrigator 100 may include a base 102, a reservoir 104 for storing fluid, and a handle 106 configured to irrigate or spray fluid into a user's mouth. The handle 106 may be fluidically connected to the reservoir 104 through at least a hose 108 extending from the handle 106 to the base 102.

The base 102 may provide support for the reservoir 104 and the handle 106, as well as house many of the drive and power assembly components of the oral irrigator 100. For example, the base 102 may house a pump, one or more controls, and/or a motor, as explained below. The base 102 may support one or more of the internal components of the oral irrigator 100, such as providing a chassis structure for mounting the pump, motor, or other internal components of the oral irrigator 100. The base 102 may include or define a housing 114 to cover the internal components to conceal them, as well as provide protection for those components.

In some embodiments, the base 102 may include a dock 118 or other structure to releasably support the handle 106. As shown, the dock 118 may be embodied as a boss extending from the housing 114, the boss including an indent 120, such as defined on a vertical end wall or surface 122 of the dock 118. The indent 120 may be configured to receive a portion of the handle 106. For example, a back portion of the handle 106 may be received and releasably held within the indent 120. In such embodiments, the handle 106 may be magnetically coupled to the dock 118 to releasably hold the handle 106 to the dock 118. Such embodiments are exemplary only, and other configurations are contemplated. For example, the dock 118 may include a C-clamp structure defining a cradle in which the handle 106 is supported as the handle 106 rests in or on the dock 118, among other configurations.

As shown, the base 102 may include one or more features for storing excess lengths of the hose 108. For example, the length of the boss may allow the hose 108 to be wrapped around the dock 118 when the handle 106 is coupled to the dock 118. In some embodiments, the base 102 may include a hose cavity 126 to receive and support the hose 108 when the handle 106 is coupled to the dock 118. The hose 108 may have a memory biasing the hose 108 to form a helically wound shape when the hose 108 is collapsed for storage. Depending on the application, the hose cavity 126 may be recessed into the housing 114, may be flush with the housing 114, or may extend outwards from the housing 114.

The base 102 may include other features. For example, the base 102 may include a power button 130 and a pressure control switch 132. As shown, the power button 130 may be positioned on a post 134 extending from the base 102 such that the power button 130 (or top surface of the post 134) is flush or generally flush with the top of the reservoir 104 for ease of use and identification of the power button 130. Actuation of the power button 130 may change or cycle the oral irrigator 100 between power modes (e.g., between on, off, and a sleep mode, etc.). User actuation of the pressure control switch 132 may vary the fluid pressure provided by the oral irrigator 100 through the handle 106. For example, the pressure control switch 132 may be slid, rotated, depressed, or otherwise actuated by the user to alter one or more characteristics of a fluid pathway between the reservoir 104 and the handle 106, as explained in more detail below. In some embodiments, the oral irrigator 100 may include a mode selector switch. In such embodiments, actuation of the mode selector switch may change or cycle the oral irrigator 100 between operation modes of the oral irrigator 100. The operation modes may include a normal mode, a clean mode, a massage mode, a soft mode, and the like.

The reservoir 104 may be attached to or rest on the base 102. For example, the bottom of the reservoir 104 may be shaped to complement the shape of the top of the base 102. In some embodiments, a portion of the bottom of the reservoir 104 may be received within the base 102 to locate and connect the reservoir 104 to the base 102. In some embodiments, the reservoir 104 may be shaped to complement the base 102. For example, the reservoir 104 may be shaped to fit around the post 134 extending from the base 102. As shown, the reservoir 104 includes a lid 140. At least a portion of the lid 140 may be removable from the reservoir 104 to fill or drain the reservoir 104. For example, the lid 140 may include a first portion 142 securable to the reservoir 104 and a second portion 144 pivotable relative to the first portion 142 and away from the reservoir 104 to define an opening through which fluid may be added or removed from the reservoir 104. Depending on the application, the reservoir 104 may be removable from the base 102, such as for cleaning, filling/draining of the reservoir 104, or other purposes.

The handle 106 may include a tip 150 defining a fluid pathway to a nozzle 152 from which fluid is expelled from the handle 106. The tip 150 may be configured to be inserted into a user's mouth to expel fluid against a user's teeth, gums, tongue, etc. The tip 150 may be selectively removed from the handle 106, such as via an eject button 154 (see FIG. 2). The removability of the tip 150 may provide many benefits. For instance, the tip 150 may be replaced as desired, such as when the tip 150 reaches its useful end of life, is damaged, or is contaminated, among others. In addition, the removability of the tip 150 may allow multiple users to hygienically use the same handle 106, with each user attaching a respective tip 150 to the handle 106 for separate use.

In some embodiments, the handle 106 includes one or more actuators to control one or more characteristics or parameters of the oral irrigator 100. For example, the handle 106 may include a pause button 160 to selectively place the oral irrigator 100 in a pause mode. During the pause mode, fluid flow is limited or restricted through the handle 106, which may be useful, for example, when a user wishes to pause oral irrigation. To initiate a pause mode, a user may slide or depress the pause button 160 to block fluid flow through the handle 106. To resume normal operation, the user may release or again actuate (e.g., slide or depress) the pause button 160 to allow fluid flow through the handle 106. In some embodiments, the handle 106 may be similar to the handle disclosed in U.S. Pat. No. 10,010,389 B2 entitled "DENTAL WATER JET DEVICE," the disclosure of which is incorporated herein in its entirety. The handle 106 may be positionable between a first mode and a second mode. In the first mode, fluid may flow through the handle 106 (e.g., an operation mode). In the second mode, fluid flow through the handle 106 may be limited or restricted (e.g., a pause mode).

Figure 2:
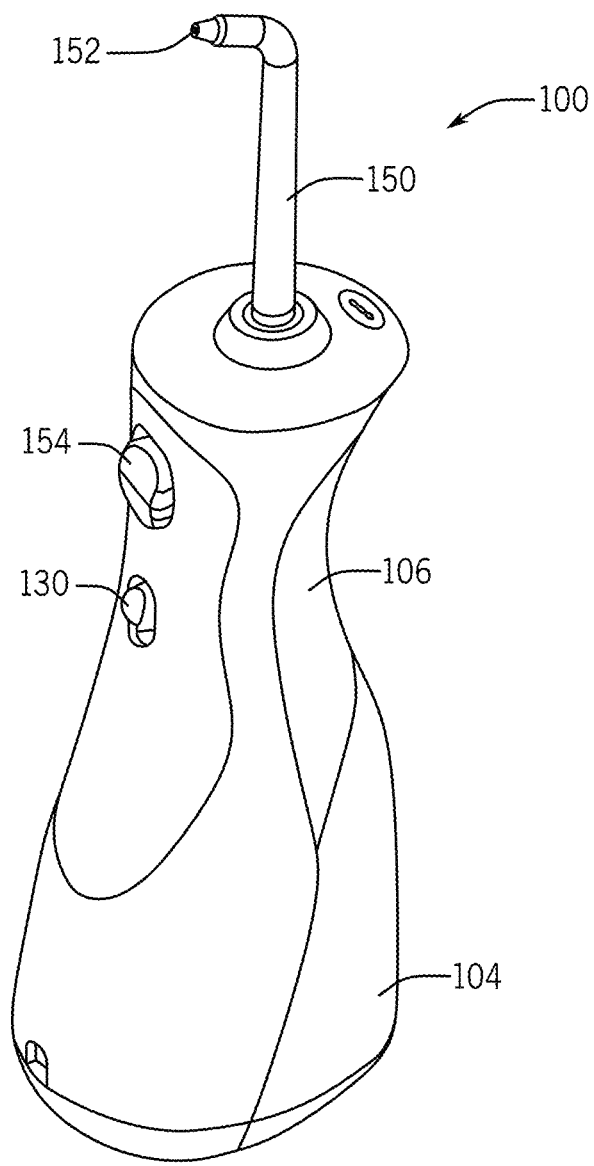
FIG. 2 illustrates an isometric view of a handheld oral irrigator in accordance with an embodiment of the disclosure.

The oral irrigator 100 illustrated in FIG. 1 is configured for countertop use, such as including a plurality of feet 162 to support the base 102 on a countertop surface. However, such configurations are exemplary only, and the oral irrigator 100 may include other configurations. For example, FIG. 2 illustrates the oral irrigator 100 embodied as a handheld irrigator. Referring to FIG. 2, in examples where the oral irrigator 100 is a handheld unit, the reservoir 104 and handle 106 may be connected together. The reservoir 104 may include a removable cavity that may refilled by a user and then reattached to the handle 106. Additionally, in these examples, the internal components of the oral irrigator 100, such as the motor and pump, may be included within the handle 106 rather than in a base unit. The description of the oral irrigation described below is generally directed to the oral irrigator 100 illustrated in FIG. 1; however, it should be noted that the description is equally applicable to the oral irrigator 100 shown in FIG. 2, with the exception that the internal components of the base 102 are included in the handle 106.

Figure 3:
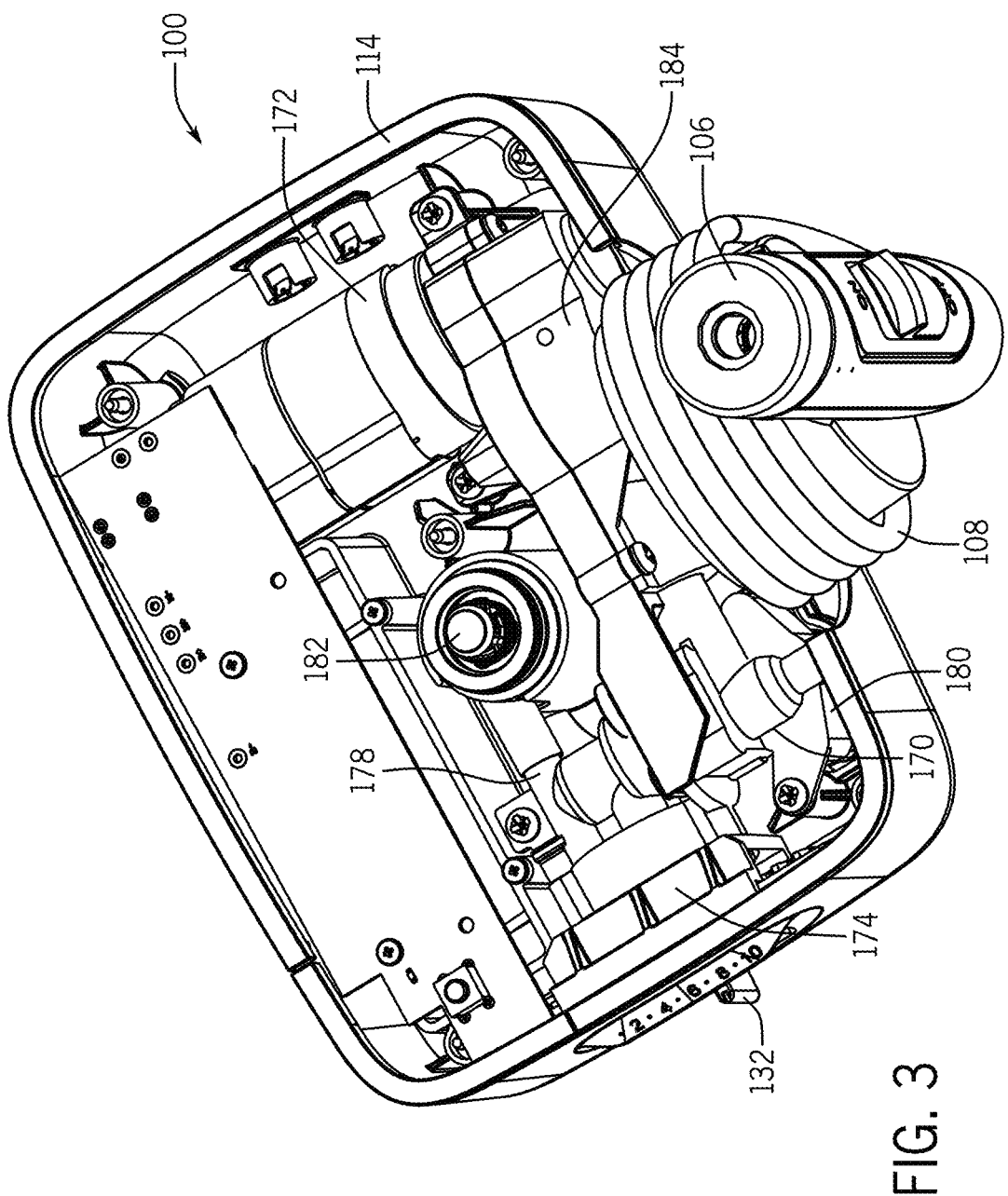
FIG. 3 illustrates a partial cut-away view of the oral irrigator in accordance with an embodiment of the disclosure.

FIG. 3 illustrates a partial cut-away view showing one or more internal components of the oral irrigator 100 in accordance with an embodiment of the disclosure. In FIG. 3, select elements are hidden for clarity. Referring to FIG. 3, the oral irrigator 100 may include a pump assembly 170, a motor 172, and a pressure adjustment assembly 174. As shown, the pump assembly 170 may include an inlet 178 and an outlet 180. The inlet 178 may be fluidically connected to the reservoir 104, such as via a port 182. In such embodiments, the port 182 may be opened when the reservoir 104 is connected to the base 102, such as placement of the reservoir 104 on the base 102, thereby opening the port 182 to allow fluid flow through the port 182. When the reservoir 104 is removed from the base 102, the port 182 may close, such as automatically under spring pressure. The outlet 180 may be fluidically connected to the hose 108 to deliver fluid from the pump assembly 170 to the handle 106. As a result, fluid may flow from the reservoir 104, through the port 182, and into the inlet 178 of the pump assembly 170. During operation, fluid entering the inlet 178 may be pumped through the pump assembly 170, out the outlet 180 of the pump assembly 170, and to the handle 106 through the hose 108.

The motor 172 may be any type of motor configured to drive movement or create mechanical work sufficient to drive the pump assembly 170. For example, the motor 172 may be a direct current motor, where the speed of the motor 172 may be controlled by a signal. In some embodiments, the motor 172 may be similar to the motor and motor control disclosed in U.S. Patent Application Publication No. 2017/0239132 A1 entitled "ORAL IRRIGATOR WITH VARIABLE OUTPUT FLUID CHARACTERISTICS," the disclosure of which is incorporated herein in its entirety. As shown, a gearbox 184 may connect the motor 172 to the pump assembly 170. The gearbox 184 may include one or more gears, linkages, or other structures configured to convert rotation of the motor's output shaft into movement sufficient to drive the pump assembly 170.

The pressure adjustment assembly 174 may include many configurations configured to control fluid flow through the pump assembly 170 from the inlet 178 to the outlet 180 based on actuation of the pressure control switch 132. For example, based on the position of the pressure control switch 132, the pressure adjustment assembly 174 may vary the fluid pressure at the outlet 180 of the pump assembly 170, such as by varying an amount of fluid bleed-off or bypass under pressure. In one embodiment, the pressure adjustment assembly 174 may be configured to adjust an output pressure at the handle 106. In some embodiments, the pressure adjustment assembly 174 may be similar to the flow control disclosed in U.S. Pat. No. 10,010,389 B2.

Figure 4:
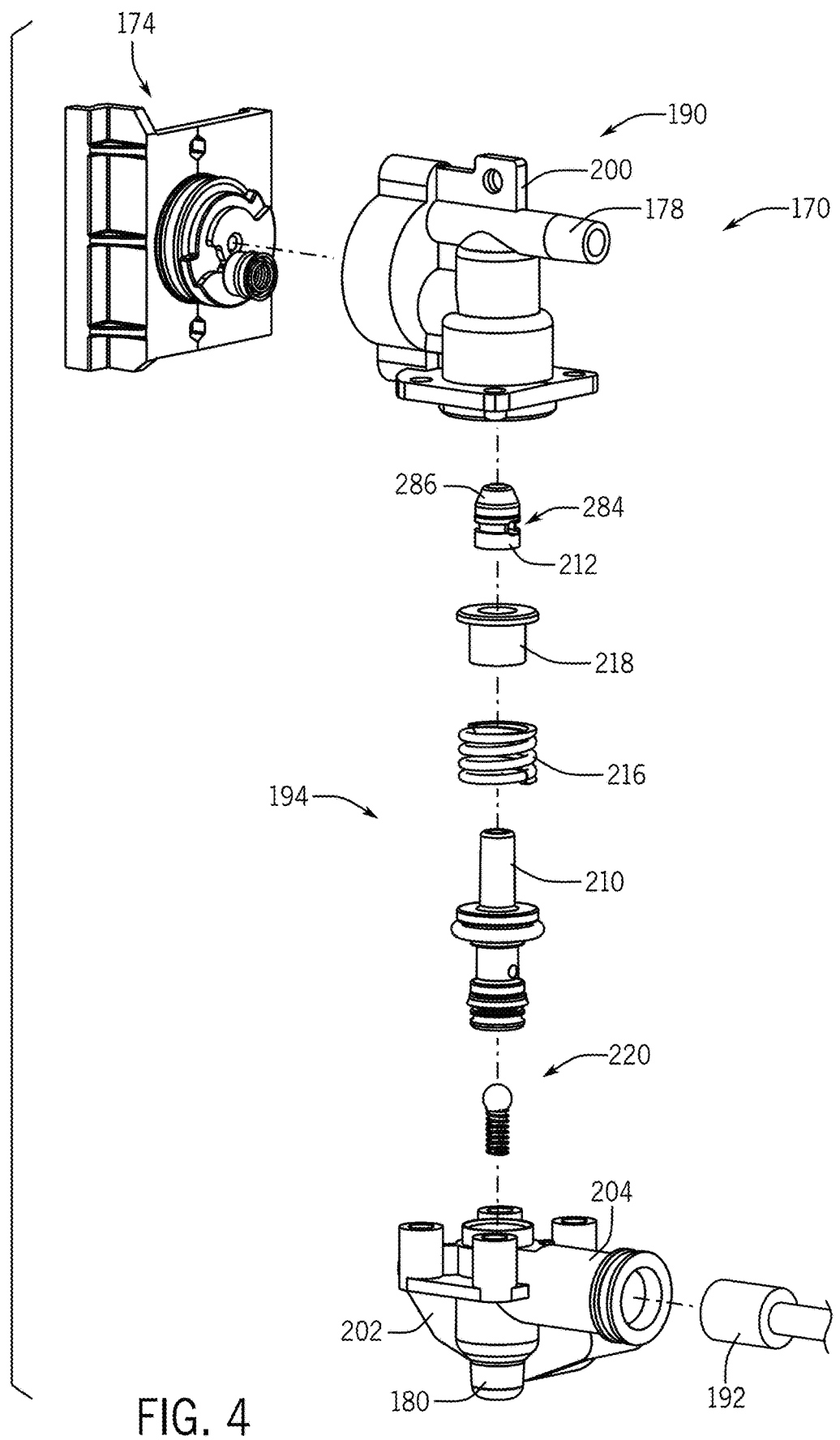
FIG. 4 illustrates an exploded view of a pump assembly of an oral irrigator in accordance with an embodiment of the disclosure.

FIG. 4 illustrates an exploded view of the pump assembly 170 in accordance with an embodiment of the disclosure. As shown, the pump assembly 170 may include a pump body 190, a piston 192, and a valve assembly 194 positioned within the pump body 190. As described herein, operation of the piston 192 (e.g., via the motor 172) and the configuration of the valve assembly 194 within the pump body 190 may control fluid flow through the pump body 190. For example, the valve assembly 194 may be positionable in a first configuration allowing fluid flow through the outlet 180 of the pump body 190 during operation of the piston 192 by the motor 172. At any time during operation of the piston 192 by the motor 172, the valve assembly 194 may be positionable in a second configuration to limit fluid flow through the outlet 180 of the pump body 190, such as by placing the oral irrigator 100 in a pause mode.

As shown, the pump body 190 may include a first pump body 200 connected to a second pump body 202. In such embodiments, the first pump body 200 may include the inlet 178 and the second pump body 202 may include the outlet 180. The pressure adjustment assembly 174 may be connected to the first pump body 200, and the piston 192 may be associated with the second pump body 202. For example, the second pump body 202 may include a piston housing 204 configured to receive the piston 192. During operation, at least a portion of the piston 192 may reciprocate within the piston housing 204 to drive fluid flow through the pump assembly 170, as detailed below.

The valve assembly 194 includes multiple valves that cooperate with one another to define or limit fluid flow through the pump assembly 170. As shown in FIG. 4, the valve assembly 194 may include a bypass valve 210 and an inlet valve 212. Each of the bypass valve 210 and the inlet valve 212 may be movable between positions to control fluid flow through the pump assembly 170. For example, the bypass valve 210 may be movable between a first position and a second position. In the first position, the bypass valve 210 may direct fluid between the inlet 178 and the outlet 180. In the second position, the bypass valve 210 may limit fluid through the outlet 180, as explained more fully below.

The inlet valve 212, which may be referred to as a first valve, a first valve assembly, or an inlet valve assembly, may be movable between open and closed positions. In the open position, the inlet valve 212 may allow fluid flow from the inlet 178. In the closed position, the inlet valve 212 may limit fluid flow from the inlet 178. In some embodiments, and as described more fully below, the inlet valve 212 may be movable between the open and closed positions irrespective of the position of the bypass valve 210. For instance, the inlet valve 212 may be movable between its open and closed positions when the bypass valve 210 is positioned in the first position and the second position.

The pump assembly 170 may include additional features. For instance, the pump assembly 170 may include a spring 216 and spring cap 218 to control the position of the bypass valve 210 within the pump body, as explained below. In some embodiments, the pump assembly 170 may include a one-way flow assembly 220 positioned near the outlet 180 to establish one-way flow through the outlet 180 and limit reverse fluid flow from the hose 108 and into the pump assembly 170.

Figure 5:
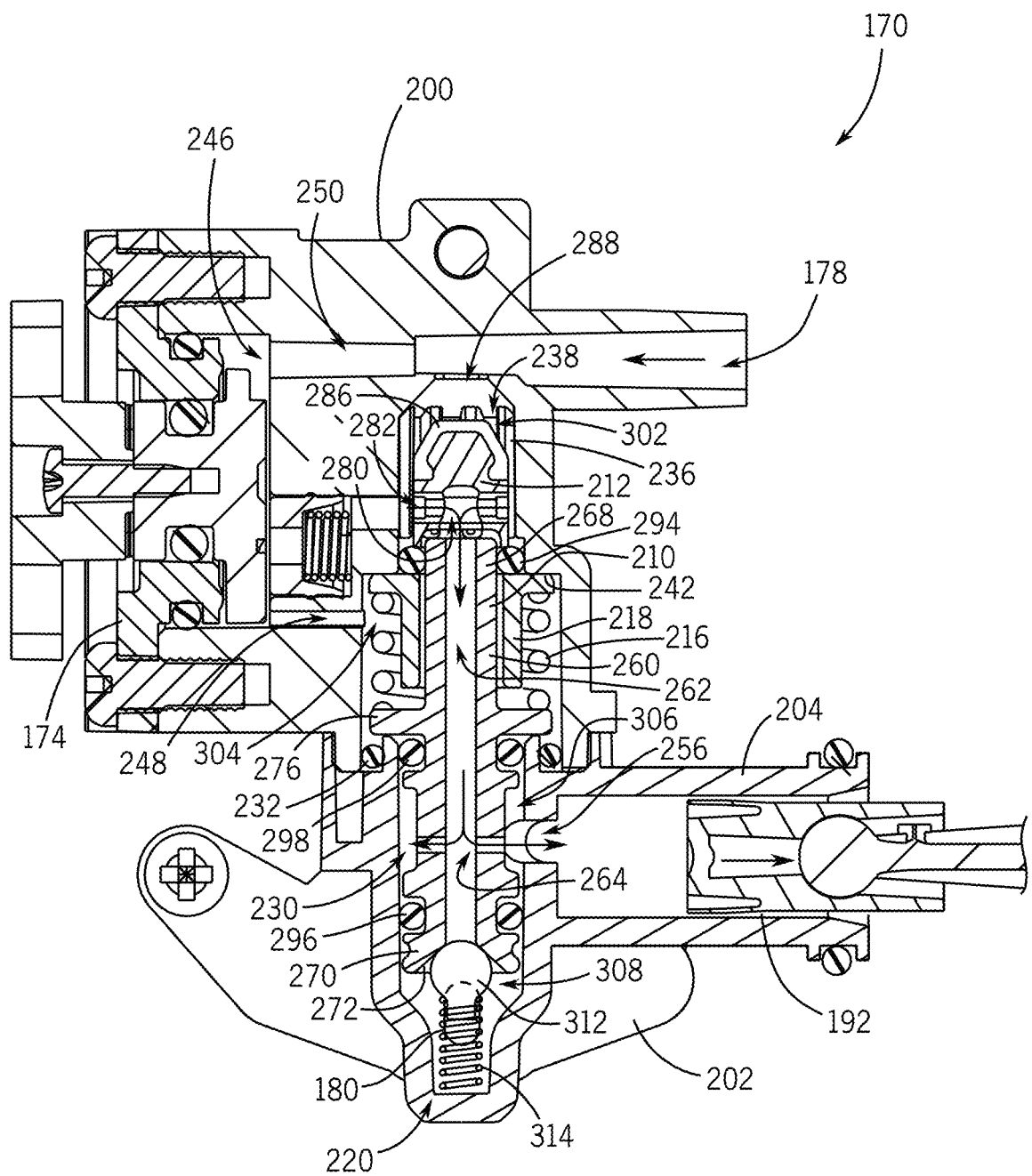
FIG. 5 illustrates a cross-sectional view of the pump assembly in a first configuration in accordance with an embodiment of the disclosure.

FIG. 5 illustrates a cross-sectional view of the pump assembly 170 in accordance with an embodiment of the disclosure. As shown in FIG. 5, the pump assembly 170 may include a valve chamber 230 fluidically connecting the inlet 178 to the outlet 180. The valve chamber 230 may be defined by the first pump body 200 and the second pump body 202. For instance, the first pump body 200 may define a first portion of the valve chamber 230, and the second pump body 202 may define a second portion of the valve chamber 230. In such embodiments, a seal 232 may be positioned at the interface between the first pump body 200 and the second pump body 202 to fluidically seal the valve chamber 230 at the interface.

The first pump body 200 may include many configurations defining one or more fluid flow characteristics within the valve chamber 230. For example, the first pump body 200 may include a plurality of ribs 236 extending within the valve chamber 230 adjacent to or alongside the inlet valve 212. The ribs 236 may provide one or more movement constraints for the inlet valve 212. For instance, the ribs 236 may be configured to allow linear movement of the inlet valve 212 within the valve chamber 230 (e.g., between the open and closed positions) while also limiting other movement of the inlet valve 212, such as rotation of the inlet valve 212 about a transverse axis, lateral shifting of the inlet valve 212, etc. In some embodiments, the ribs 236 may allow rotation of the inlet valve 212 about an axis generally parallel to the valve chamber 230, or at least generally parallel to the portion of the valve chamber 230 in which the inlet valve 212 is received. The ribs 236 may extend parallel or generally parallel to one another to define a plurality of grooves 238 between the ribs 236. In this manner, the ribs 236 (and grooves 238) may define a partial cylindrical wall that allows fluid flow around the inlet valve 212.

The first pump body 200 may include a shoulder 242 within the valve chamber 230. The internal diameter of the valve chamber 230 within the first pump body 200 may be stepped at the shoulder 242, such that the shoulder 242 defines a ledge within the valve chamber 230. As shown, the spring cap 218 may be positionable against the shoulder 242 of the first pump body 200. For example, the spring 216 may bias the spring cap 218 against the shoulder 242 of the first pump body 200, for purposes explained below.

With continued reference to FIG. 5, the pump assembly 170 may include a bypass flow circuit 246 within or associated with the first pump body 200. As described herein, the bypass flow circuit 246 may define a secondary flow circuit through the pump assembly 170 when fluid flow through the outlet 180 is limited (e.g., when the handle 106 is placed in the pause mode). The bypass flow circuit 246 may fluidically connect the valve chamber 230 to the inlet 178 of the pump assembly 170 to direct fluid between the valve chamber 230 and the inlet 178 based on the position of the bypass valve 210 within the valve chamber 230. For example, the first position of the bypass valve 210 may limit fluid flow through the bypass flow circuit 246. In such embodiments, the second position of the bypass valve 210 may permit fluid flow through the bypass flow circuit 246, as described below.

The bypass flow circuit 246 may be defined by one or more flow channels fluidically connected to the valve chamber 230 within the first pump body 200. For instance, the bypass flow circuit 246 may include a first flow channel 248 in fluid communication with the valve chamber 230 and a second flow channel 250 in fluid communication with the inlet 178. As shown, the first flow channel 248 may be defined adjacent to the shoulder 242, such as between the shoulder 242 and the second pump body 202. When fluid flow through the outlet 180 is limited (e.g., when the handle 106 is placed in the pause mode), fluid may flow through the first flow channel 248 and the second flow channel 250 of the bypass flow circuit 246 to divert fluid and fluid pressure within the valve chamber 230 to the inlet 178 of the pump assembly 170.

In some embodiments, the pressure adjustment assembly 174 may be integrated at least partially with the bypass flow circuit 246. For instance, the first flow channel 248 and the second flow channel 250 of the bypass flow circuit 246 may be in fluid communication with the pressure adjustment assembly 174. Specifically, fluid flowing through the first and second flow channels 248, 250 may flow around or adjacent to the pressure adjustment assembly 174. In some embodiments, at least one channel of the bypass flow circuit 246 may correspond to a channel of the pressure adjustment assembly 174. For example, the pressure adjustment assembly 174 and the bypass flow circuit 246 may both utilize the second flow channel 250 to divert fluid away from the valve chamber 230.

Like the first pump body 200, the second pump body 202 may include many configurations defining fluid flow through the pump assembly 170. For example, the second pump body 202 may include one or more apertures 256 fluidically connecting the valve chamber 230 to the piston housing 204. In such embodiments, fluid may flow through the one or more apertures 256 between the valve chamber 230 and the piston housing 204 as the piston 192 reciprocates within the piston housing 204.

With continued reference to FIG. 5, fluid may be directed through the bypass valve 210. For example, the bypass valve 210 may include a hollow rod section 260 with one or more bores defined therethrough to direct fluid within the valve chamber 230. As shown, the bypass valve 210 may include a longitudinal bore 262 extending a length of the hollow rod section 260 and a plurality of transverse bores 264 defined through the hollow rod section 260 to the longitudinal bore 262. The transverse bores 264 may extend radially from the longitudinal bore 262, such as in a radial spoke pattern. During operation of the pump assembly 170, fluid may flow through the longitudinal bore 262 and the transverse bores 264 of the bypass valve 210. As shown, the bypass valve 210 may include a first end 268 near the inlet 178 and a second end 270 near the outlet 180. The longitudinal bore 262 may extend through the first end 268 of the bypass valve 210. In some embodiments, the second end 270 of the bypass valve 210 may be open such that the longitudinal bore 262 is defined through the entire length of the bypass valve 210. The second end 270 may include an end surface 272 adjacent to the outlet 180. Depending on the application, the end surface 272 may be flat or include a different shape, such as a frustoconical shape as shown.

In some embodiments, the bypass valve 210 may include a ledge 276 extending annularly from the hollow rod section 260. In such embodiments, the spring 216 may be seated against the ledge 276 to bias the ledge 276 away from the spring cap 218 (or shoulder 242 of the first pump body 200). In some embodiments, the ledge 276 may be pressable against the second pump body 202, such as via the spring 216, to define the first position of the bypass valve 210 allowing fluid flow through the outlet 180 of the pump assembly 170. In this manner, the spring 216 may bias the ledge 276 against a first stop to define the first position. In some embodiments, the ledge 276 may be pressable against a second stop to define the second position of the bypass valve 210 limiting fluid flow through the outlet 180, as explained below. Depending on the application, the second stop may be defined by the spring cap 218. In such embodiments, the spring 216 may be positioned against the ledge 276 and the spring cap 218 to bias the ledge 276 and the spring cap 218 away from each other.

Like the bypass valve 210, fluid may be directed through the inlet valve 212 during operation of the pump assembly 170. For instance, the inlet valve 212 may include a central bore 280 and a plurality of side bores 282 defined through the inlet valve 212 to the central bore 280. The side bores 282 may extend radially from the central bore 280, such as in a radial spoke pattern. During operation of the pump assembly 170, fluid may flow through the side bores 282 and the central bore 280 of the inlet valve 212. In some embodiments, the inlet valve 212 may include a groove 284 (see FIG. 4) extending annular around the inlet valve 212 adjacent to the side bores 282. The groove 284 may aid fluid flow around the inlet valve 212 and into the side bores 282. As shown, the inlet valve 212 may include a curved end 286 (e.g., a frustoconical-shaped end) to sealingly engage a chamber inlet 288 of the valve chamber 230. The opposite end of the inlet valve 212 may be shaped to matingly engage the bypass valve 210. For instance, the inlet valve 212 may include a dished end to engage the first end 268 of the bypass valve 210.

The bypass valve 210 may be sealed against the valve chamber 230 in a plurality of locations. For example, the valve assembly 194 may include a first seal 294, a second seal 296, and a third seal 298. The first seal 294 may seal a first portion of the bypass valve 210 to a first surface of the valve chamber 230 near the inlet 178. For example, the first seal 294 may seal the bypass valve 210 to the first pump body 200 near the shoulder 242 of the first pump body 200. The second seal 296 may seal a second portion of the bypass valve 210 to a second surface of the valve chamber 230 near the outlet 180. For example, the second seal 296 may seal the bypass valve 210 to the second pump body 202 between the outlet 180 and the one or more apertures 256 to the piston housing 204. The third seal 298 may selectively seal a third portion of the bypass valve 210 to a third surface of the valve chamber 230 between the first seal 294 and the second seal 296. For instance, the third seal 298 may selectively seal the bypass valve 210 to the second pump body 202 near the interface between the first pump body 200 and the second pump body 202. The first seal 294, second seal 296, and third seal 298 may be an off-the-shelf O-ring or other gasket configured to create a seal at the interface between the bypass valve 210 and the pump body 190.

In such embodiments, the various seals may define separate fluid chambers within the valve chamber 230. For example, a first fluid chamber 302 may be defined between the first seal 294 and chamber inlet 288, a second fluid chamber 304 may be defined between the first seal 294 and the third seal 298, a third fluid chamber 306 may be defined between the second seal 296 and the third seal 298, and a fourth fluid chamber 308 may be defined between the third seal 298 and the outlet 180. The first fluid chamber 302 may be referred to as an inlet or upper chamber, the second fluid chamber 304 may be referred to as a bypass or middle chamber, the third fluid chamber 306 may be referred to as a piston chamber, and the fourth fluid chamber 308 may be referred to as an outlet or lower chamber. In such embodiments, the first seal 294 may seal off the inlet chamber from the bypass chamber, the second seal 296 may seal off the outlet chamber from the piston chamber, and the third seal 298 may selectively seal off the piston chamber from the bypass chamber.

With continued reference to FIG. 5, the one-way flow assembly 220, which may be referred to as a second valve, a second valve assembly, or an outlet valve assembly, may be positioned at or adjacent to the second end 270 of the bypass valve 210 near the outlet 180. Depending on the application, the one-way flow assembly 220 may include a check valve structure, such as a ball 312 biased by a spring 314 against the end surface 272 of the bypass valve 210. In such embodiments, the one-way flow assembly 220 may allow fluid to flow into the fourth fluid chamber 308 but also limit reverse fluid flow out of the fourth fluid chamber 308.

Figure 6:
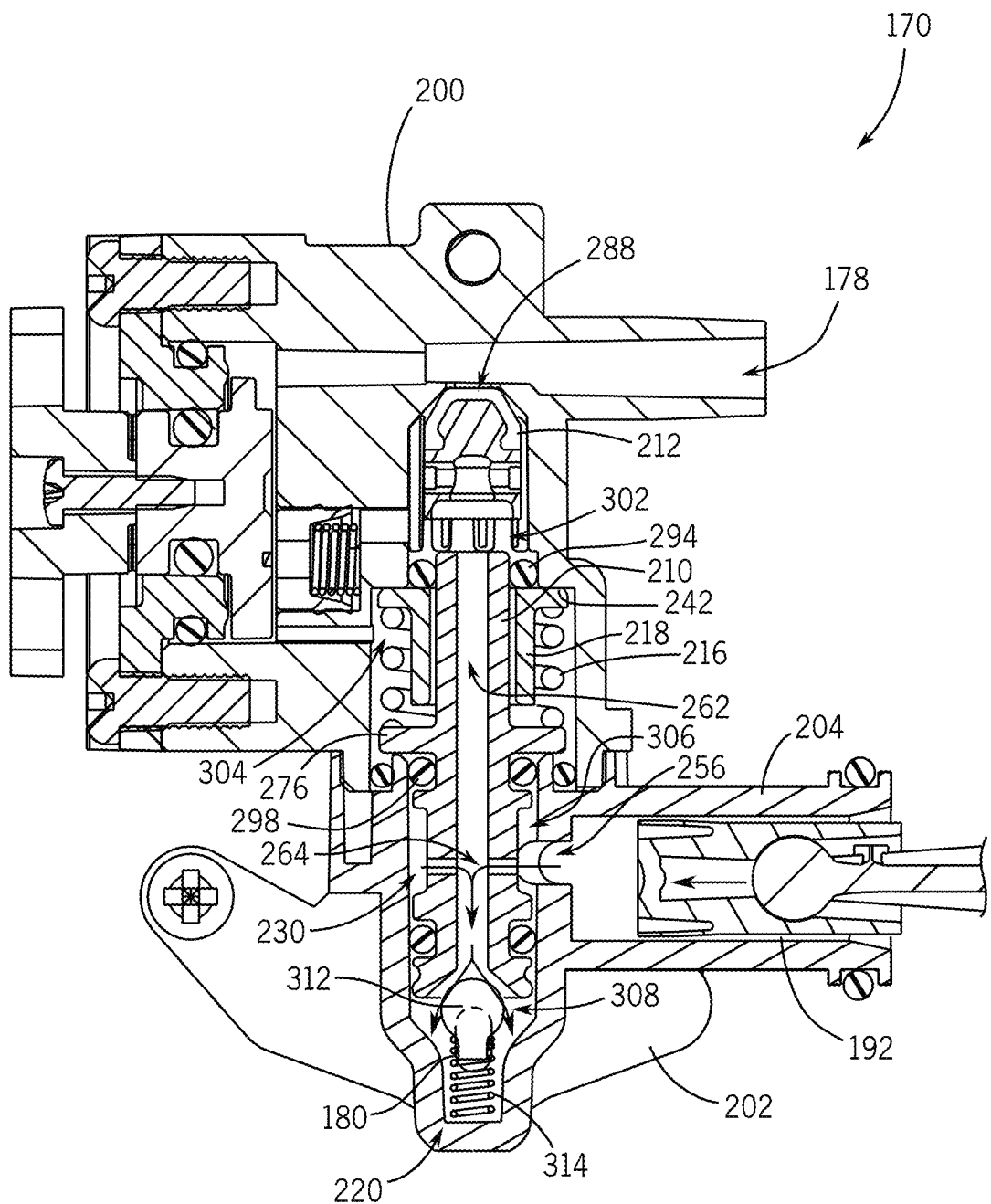
FIG. 6 illustrates a cross-sectional view of the pump assembly in a second configuration in accordance with an embodiment of the disclosure.
Figure 7:
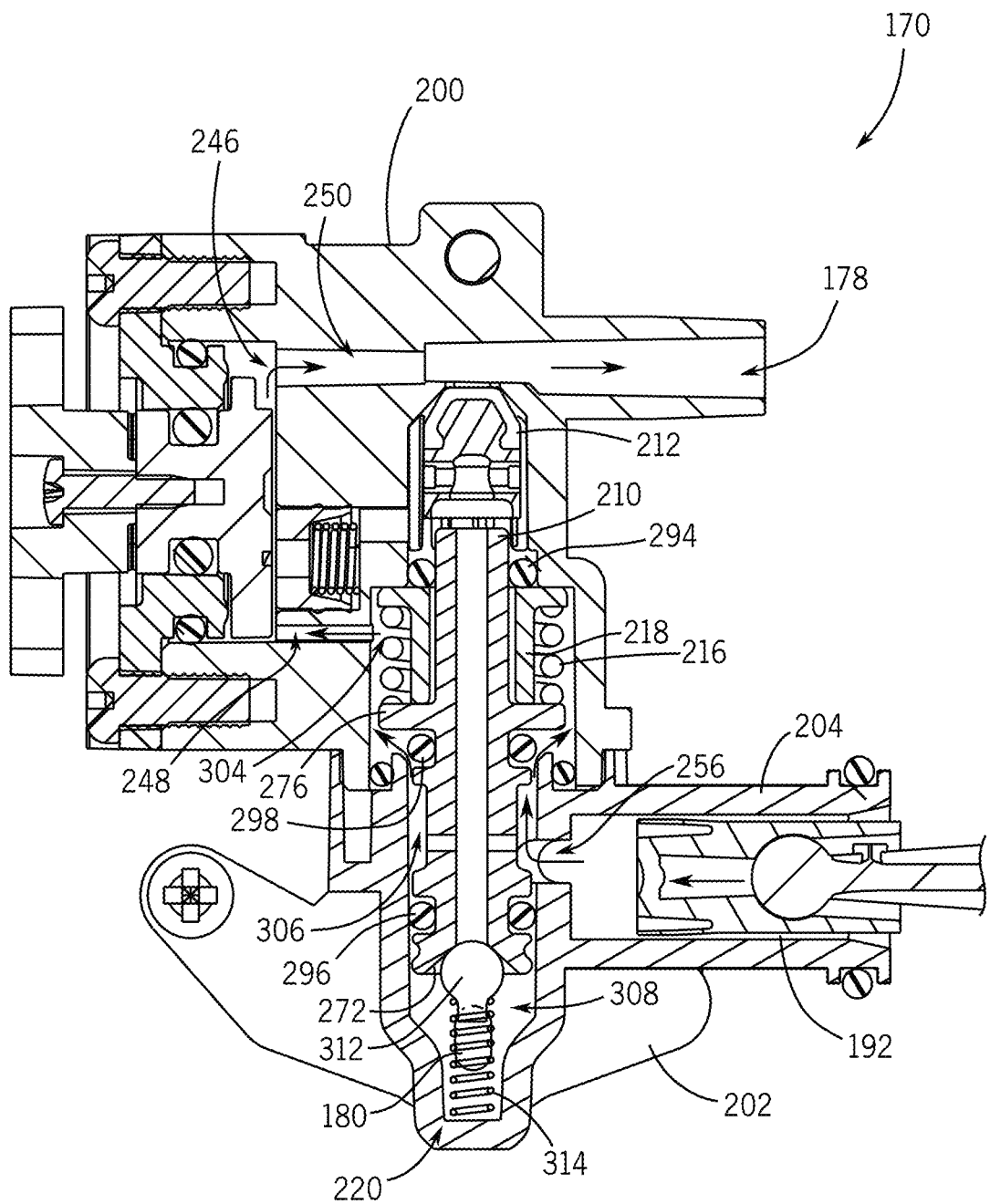
FIG. 7 illustrates a cross-sectional view of the pump assembly in a third configuration in accordance with an embodiment of the disclosure.
Figure 8:
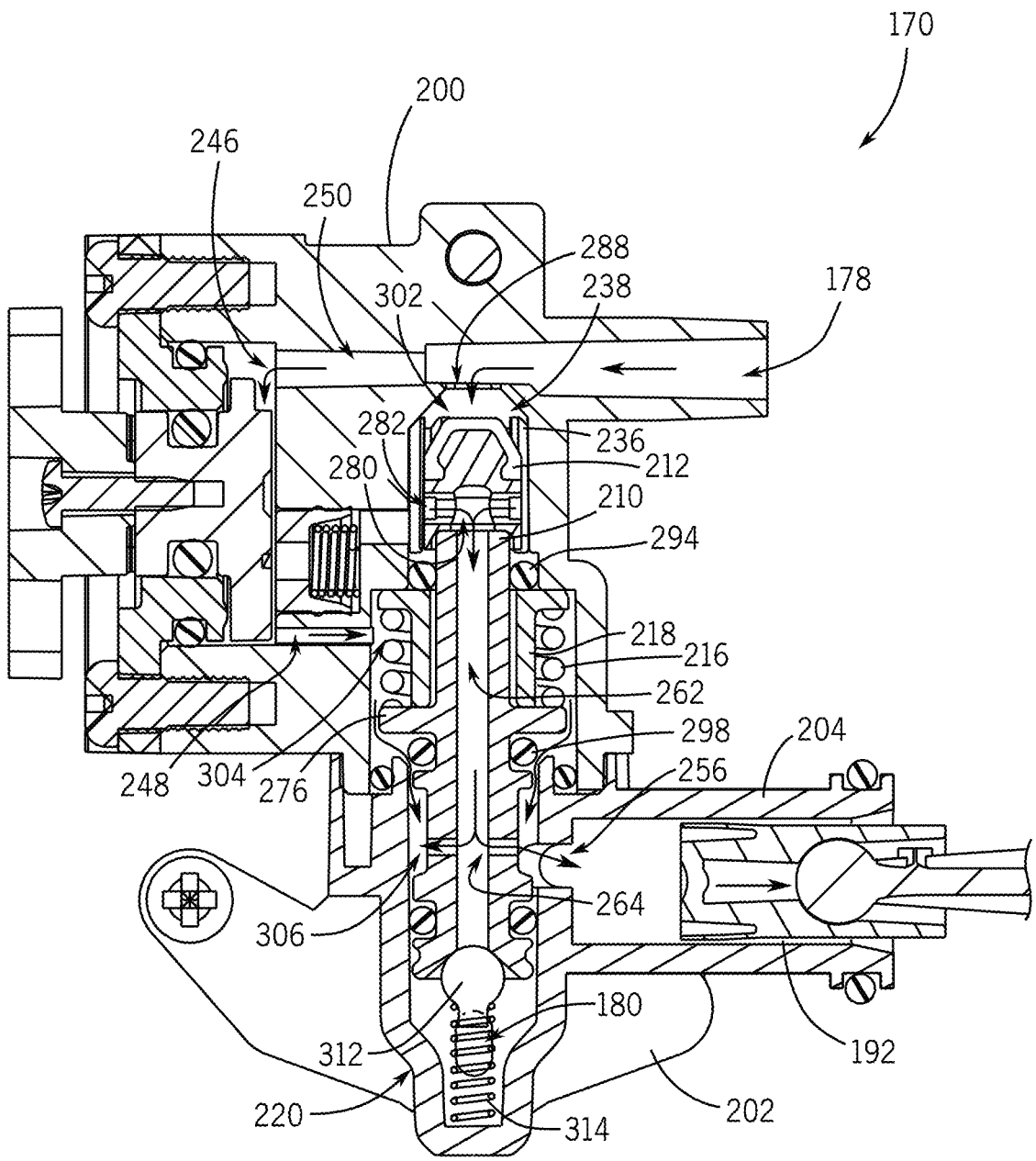
FIG. 8 illustrates a cross-sectional view of the pump assembly in a fourth configuration in accordance with an embodiment of the disclosure.

FIG. 5 illustrates a cross-sectional view of the pump assembly 170 in a first configuration in accordance with an embodiment of the disclosure. FIG. 6 illustrates a cross-sectional view of the pump assembly 170 in a second configuration in accordance with an embodiment of the disclosure. FIG. 7 illustrates a cross-sectional view of the pump assembly 170 in a third configuration in accordance with an embodiment of the disclosure. FIG. 8 illustrates a cross-sectional view of the pump assembly 170 in a fourth configuration in accordance with an embodiment of the disclosure. Referring to FIGS. 5-8, the valve assembly 194 may move within the valve chamber 230 to control fluid flow through the pump assembly 170. For example, both the bypass valve 210 and the inlet valve 212 may move within the valve chamber 230 to control fluid flow between the inlet 178 and the outlet 180 of the pump assembly 170.

FIG. 5 illustrates the bypass valve 210 in the first position and the inlet valve 212 in the open position. The first position of the bypass valve 210 may be associated with the first mode of the handle 106. For example, the bypass valve 210 may be positionable in the first position when fluid flows through the handle 106 for oral irrigation. Thus, FIG. 5 illustrates a vacuum stroke of the piston 192 when the handle 106 is open. In such configurations, the piston 192 may be drawn away from the valve chamber 230, creating a vacuum in the piston housing 204. The vacuum in the piston housing 204 may draw fluid into the inlet 178 of the pump assembly 170 and cause fluid to flow from the inlet 178 and through the valve assembly 194. For instance, during the vacuum stroke illustrated in FIG. 5, fluid from the reservoir 104 may be drawn into the inlet 178 of the pump assembly 170. Fluid within the inlet 178 may be drawn into the first fluid chamber 302 through the chamber inlet 288 of the valve chamber 230. As the fluid is drawn into the first fluid chamber 302 through the chamber inlet 288, fluid may flow around the inlet valve 212 through the grooves 238 defined between the ribs 236 of the valve chamber 230. Fluid flowing around the inlet valve 212 may be drawn into the side bores 282 of the inlet valve 212. The fluid within the side bores 282 may be funneled to the central bore 280 of the inlet valve 212.

As shown in FIG. 5, the vacuum stroke of the piston 192 may cause the inlet valve 212 to seat against the bypass valve 210. For instance, the dished end of the inlet valve 212 may seat against the first end 268 of the bypass valve 210, such that the central bore 280 of the inlet valve 212 is in fluid communication with the longitudinal bore 262 of the bypass valve 210. In some embodiments, the dished end of the inlet valve 212 may engage the first seal 294. In such embodiments, fluid within the central bore 280 of the inlet valve 212 may flow through the longitudinal bore 262 of the bypass valve 210 to the transverse bores 264, whereupon the fluid within the transverse bores 264 is drawn into the third fluid chamber 306. Fluid within the third fluid chamber 306 may then be drawn into the piston housing 204 through the one or more apertures 256 between the valve chamber 230 and the piston housing 204.

FIG. 6 illustrates the bypass valve 210 in the first position and the inlet valve 212 in the closed position. Specifically, FIG. 6 illustrates a compression stroke of the piston 192 when the handle 106 is open. In such configurations, the piston 192 may be moved towards the valve chamber 230, increasing fluid pressure within the piston housing 204. The fluid pressure in the piston housing 204 may cause fluid to flow through the valve assembly 194 to the outlet 180 of the pump assembly 170. For example, during the compression stroke illustrated in FIG. 6, the increased fluid pressure may cause the inlet valve 212 to seat against the chamber inlet 288 of the valve chamber 230, sealing off the valve chamber 230 from the inlet 178 of the pump assembly 170. Once the chamber inlet 288 is sealed via the inlet valve 212, fluid may flow from the piston housing 204 through the one or more apertures 256 and into the third fluid chamber 306. The fluid within the third fluid chamber 306 may flow through the transverse bores 264 and into the longitudinal bore 262 of the bypass valve 210.

The fluid pressure created by the compression stroke of the piston 192 may overcome the one-way flow assembly 220, such that fluid within the longitudinal bore 262 of the bypass valve 210 is forced into the fourth fluid chamber 308. For example, fluid pressure within the longitudinal bore 262 exerted against the ball 312 may overcome the force provided by the spring 314 seating the ball 312 against the second end 270 of the bypass valve 210. In such embodiments, the ball 312 may disengage the bypass valve 210 such that fluid may flow around the ball 312 and into the fourth fluid chamber 308. As fluid flows into the fourth fluid chamber 308, the fluid may exit the outlet 180 of the pump assembly 170 and into the hose 108 of the handle 106, whereupon fluid is expelled from the tip 150 of the handle 106 for oral irrigation. Once the pressure within the fourth fluid chamber 308 subsides or is released, the spring 314 may bias the ball 312 against the bypass valve 210 to seal the fourth fluid chamber 308 and limit reverse flow of fluid from the fourth fluid chamber 308.

The piston 192 may reciprocate within the piston housing 204 during sustained oral irrigation operation. In such embodiments, the piston 192 may alternate between the vacuum stroke and the compression stroke, often at high frequencies. As the piston 192 alternates between the vacuum stroke and the compression stroke, the inlet valve 212 may move within the first fluid chamber 302 between the open and closed positions at the same frequency. However, the bypass valve 210 may remain stationary in the first position when the handle 106 is open for oral irrigation.

In such configurations, the spring rate of the spring 216 may be tailored to the fluid pressures within the valve chamber 230 during operation. For instance, the spring rate may be sufficient such that the spring 216 holds the bypass valve 210 in the first position (e.g., seated against the first stop) during oral irrigation. More specifically, the spring rate may be sufficient to maintain engagement of the spring cap 218 with the shoulder 242 of the first pump body 200 and engagement of the ledge 276 with the second pump body 202. As a result, the first seal 294 may maintain the seal between the first pump body 200 and the bypass valve 210, and the third seal 298 may maintain the seal between the bypass valve 210 and the second pump body 202 to limit fluid flow into the second fluid chamber 304 during oral irrigation.

Figure 18:
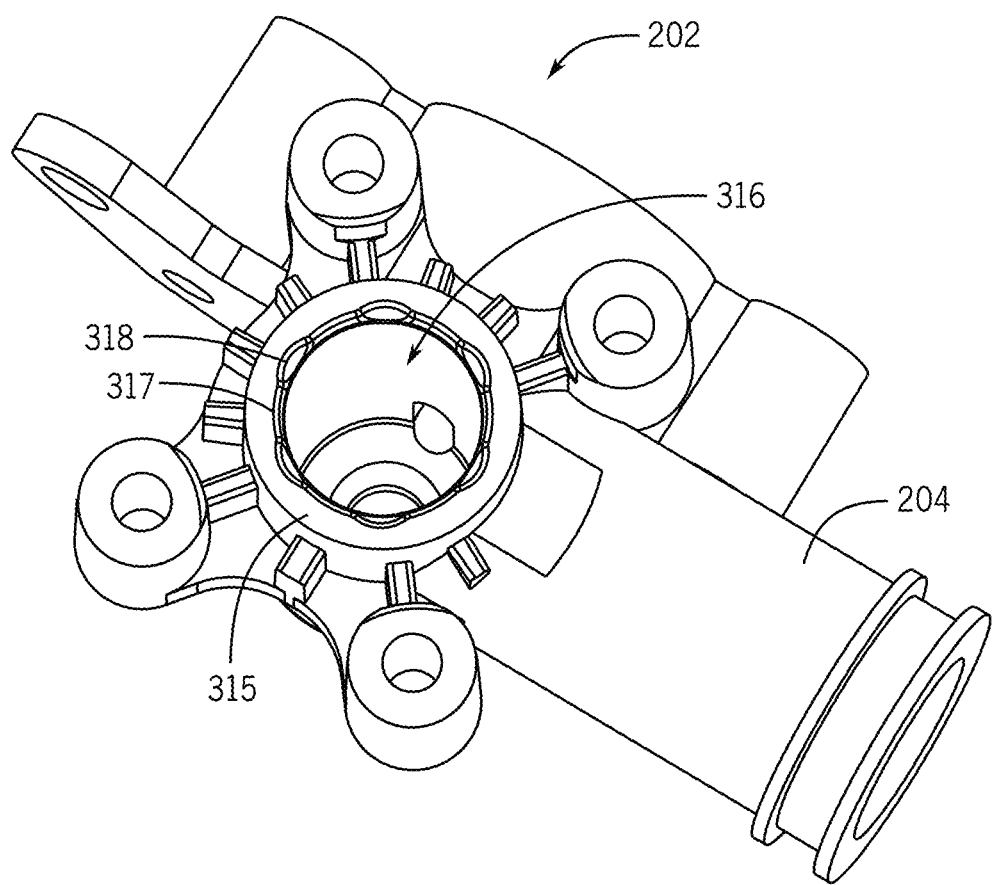
FIG. 18 illustrates a perspective view of a pump body in accordance with an embodiment of the disclosure.

FIG. 7 illustrates the bypass valve 210 in the second position and the inlet valve 212 in the closed position. Specifically, FIG. 7 illustrates a compression stroke of the piston 192 when the handle 106 is closed. The second position of the bypass valve 210 may be associated with the second mode of the handle 106. For example, the bypass valve 210 may be positionable in the second position when fluid flow through the handle 106 is stopped or limited (e.g., a pause mode of the handle 106). When the handle 106 is closed, the fluid pressure within the fourth fluid chamber 308 may build up until the fluid pressure within the outlet 180 and against the end surface 272 of the bypass valve 210 is sufficient to overcome the force of the spring 216 biasing the bypass valve 210 to the first position. When the fluid pressure overcomes the spring force, the fluid pressure may force the bypass valve 210 to its second position. Specifically, the fluid pressure within the fourth fluid chamber 308 may overcome the spring 216 and hold the bypass valve 210 in the second position against the second stop (e.g., the ledge 276 against the spring cap 218). In the second position of the bypass valve 210, the third seal 298 may disengage the second pump body 202 such that the second fluid chamber 304 is in fluid communication with the third fluid chamber 306, for purposes explained below. For example, movement of the bypass valve 210 from the first position to the second position may disengage the third seal 298 from the second pump body 202 to direct fluid from the valve chamber 230 to the bypass flow circuit 246. Depending on the application, the third seal 298 may disengage completely or partially from the second pump body 202. In some embodiments, a pliability of the third seal 298 may allow fluid to flow past the third seal 298 when the bypass valve 210 moves to the second position. In some embodiments, as shown in FIG. 18, a top edge 315 of the valve bore 316 of the second pump body 202 may include an angled surface or chamfer 317 to facilitate fluid to flow past the third seal 298 when the bypass valve 210 moves to the second position. One or more scalloped cuts or recesses 318 may be formed in the chamfer 317 to allow sufficient fluid flow past the third seal 298 when the bypass valve 210 moves to the second position. In some embodiments, as shown in FIG. 18, multiple recesses 318 may be formed in the chamfer 317 and may be spaced equidistantly around the periphery of the valve bore 316 of the second pump body 202. The number and size of the recesses 318 may vary depending on the application. The recesses 318 may release pressure on the third seal 298 to allow the third seal 298 to move out of the valve bore 316 during movement of the bypass valve 210 to the second position. The recesses 318 may reduce wear on the third seal 298, thereby extending the life of the third seal 298. The recesses 318 may help ensure uniform flow around the third seal 298, thereby reducing the likelihood of the bypass valve 210 tilting within the second pump body 202 and pinching the third seal 298 when the bypass valve 210 moves to the second position. The recesses 318 may reduce the compression on the valve spring 216 and permit the travel of the bypass valve 210 to be shortened, thereby lowering the maximum pressure inside the pump assembly 170.

As shown, the one-way flow assembly 220 may maintain engagement with the bypass valve 210 as the bypass valve 210 moves from the first position to the second position. For example, the one-way flow assembly 220 may move with the bypass valve 210 as the bypass valve 210 moves between the first position and the second position. In this manner, one-way flow through the outlet 180 may be maintained as the bypass valve 210 moves within the valve chamber 230. In addition, the second seal 296 may maintain the seal between the bypass valve 210 and the second pump body 202 as the bypass valve 210 moves between the first position and the second position. As a result, the fluid pressure within the fourth fluid chamber 308 may be maintained until flow through the handle 106 is resumed. In this manner, the bypass valve 210 may remain in the second position until the handle 106 is taken out of the second mode and positioned in the first mode.

Except as otherwise noted, fluid flow through the pump assembly 170 may be similar to that shown in FIG. 6. For instance, increased fluid pressure within the valve chamber 230 may cause the inlet valve 212 to seat against the chamber inlet 288. Because the pressure within the fourth fluid chamber 308 is holding the bypass valve 210 in the second position, fluid may flow from third fluid chamber 306 into the second fluid chamber 304 during the compression stroke of the piston 192. Consequently, fluid within the second fluid chamber 304 may flow through the bypass flow circuit 246, such as first flowing through the first flow channel 248 in fluid communication with the second fluid chamber 304. Fluid flowing through the bypass flow circuit 246 may subsequently flow through the second flow channel 250 and into the inlet 178 of the pump assembly 170 for circulation back to the reservoir 104.

FIG. 8 illustrates the bypass valve 210 in the second position and the inlet valve 212 in the open position, such that FIG. 8 illustrates a vacuum stroke of the piston 192 when the handle 106 is closed. Except as otherwise noted below, fluid flow through the pump assembly 170 may be similar to that shown in FIG. 5. For example, during the vacuum stroke of the piston 192, fluid from the reservoir 104 may be drawn into the inlet 178 of the pump assembly 170. Fluid within the inlet 178 may be drawn into the first fluid chamber 302 and around the inlet valve 212 similar to that described above with reference to FIG. 5. For instance, as the fluid is drawn into the first fluid chamber 302 through the chamber inlet 288, fluid may flow around the inlet valve 212 through the grooves 238 defined between the ribs 236 of the valve chamber 230 and into the side bores 282 and central bore 280 of the inlet valve 212. Like the vacuum stroke illustrated in FIG. 5, fluid within the central bore 280 of the inlet valve 212 may flow through the longitudinal bore 262 of the bypass valve 210 to the transverse bores 264, whereupon the fluid within the transverse bores 264 is drawn into the third fluid chamber 306.

In addition to the fluid flow mentioned above, fluid may flow through the bypass flow circuit 246 during the vacuum stroke illustrated in FIG. 8. For example, during the vacuum stroke of the piston 192, fluid from the reservoir 104 may be drawn from the inlet 178 of the pump assembly 170 through the second flow channel 250 of the bypass flow circuit 246. The fluid in the bypass flow circuit 246 may be drawn into the second fluid chamber 304 of the valve chamber 230 through the first flow channel 248 of the bypass flow circuit 246. Because the third seal 298 is disengaged in FIG. 8, fluid within the second fluid chamber 304 may be drawn into the third fluid chamber 306. Fluid within the third fluid chamber 306 may be drawn into the piston housing 204 through the one or more apertures 256 between the valve chamber 230 and the piston housing 204.

The piston 192 may reciprocate within the piston housing 204 during sustained operation while the handle 106 is closed (e.g., in a pause mode). As the piston 192 alternates between the vacuum stroke and the compression stroke, the inlet valve 212 may move between the open and closed positions, similar to sustained oral irrigation operation. However, the bypass valve 210 may remain stationary in the second position when the handle 106 is closed. In such configurations, fluid may flow through the bypass flow circuit 246 as the piston 192 reciprocates between the vacuum stroke and the compression stroke. Depending on the application, the bypass flow circuit 246 may be generally unobstructed such that fluid may flow freely or generally freely through the bypass flow circuit 246. As a result, strain on the motor 172 may be reduced when the handle 106 is closed, resulting in decreased noise and wear on one or more internal components of the oral irrigator 100 (e.g., the motor 172, gearbox 184, etc.).

Figure 9:
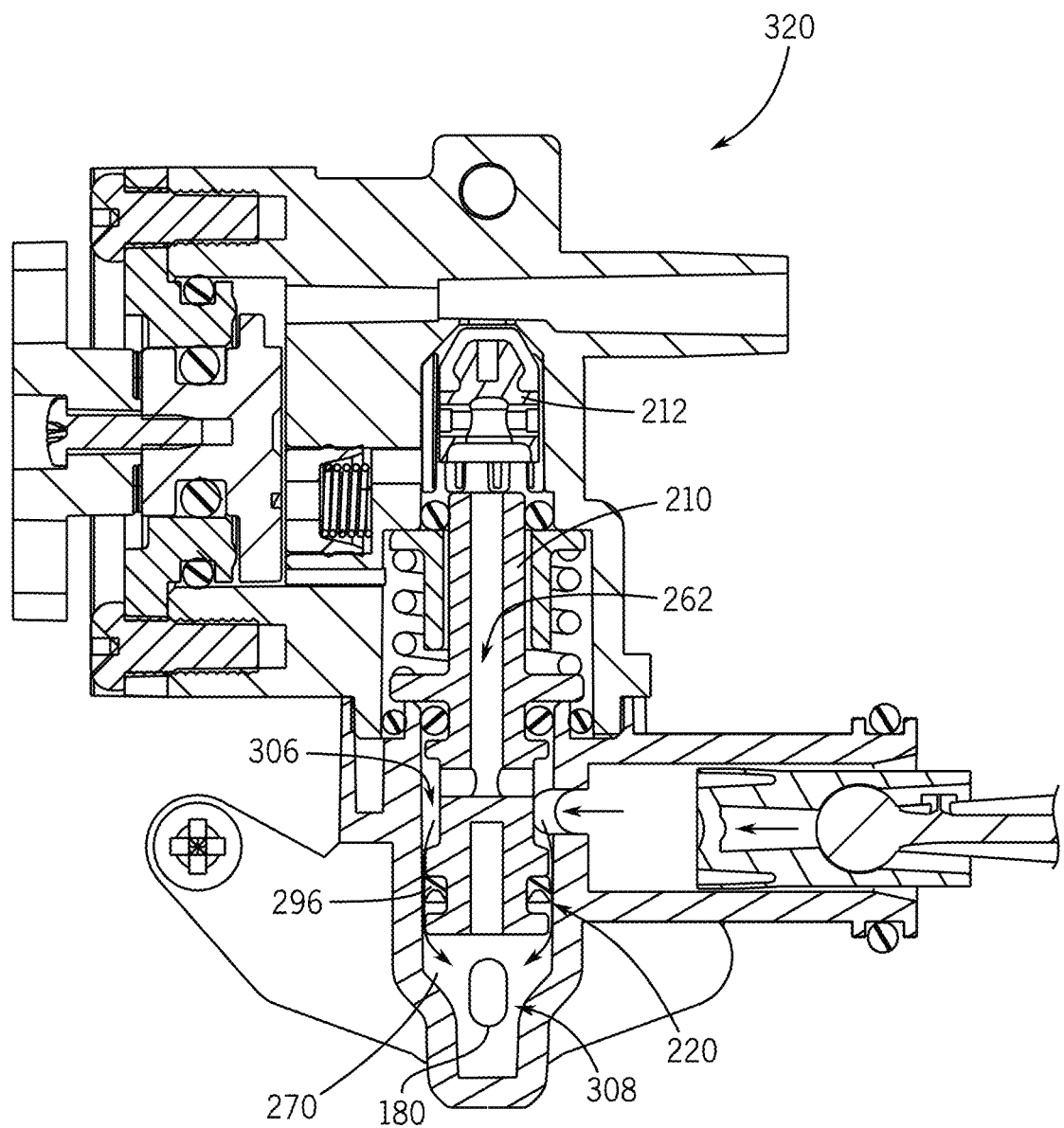
FIG. 9 illustrates a cross-sectional view of an additional pump assembly in accordance with an embodiment of the disclosure.

FIG. 9 illustrates a cross-sectional view of an additional pump assembly 320 in accordance with an embodiment of the disclosure. Except as otherwise noted below, the pump assembly 320 of FIG. 9 may be similar to the pump assembly 170 of FIGS. 3-8. Accordingly, descriptions of like features may be omitted for clarity. Also, like reference numerals may be used to identify like elements.

Referring to FIG. 9, the second end 270 of the bypass valve 210 may be solid or generally solid such that the longitudinal bore 262 does not extend through the entirety of the bypass valve 210. In such embodiments, the second seal 296 may be embodied as a U-cup seal. The U-cup seal may be configured to function as the one-way flow assembly 220. For example, the U-cup seal may allow fluid to flow from the third fluid chamber 306 to the fourth fluid chamber 308 but limit fluid flow from the fourth fluid chamber 308 to the third fluid chamber 306. In some embodiments, increased fluid pressure within the fourth fluid chamber 308 may increase the sealing engagement between the U-cup seal and the second pump body 202.

Figure 10:
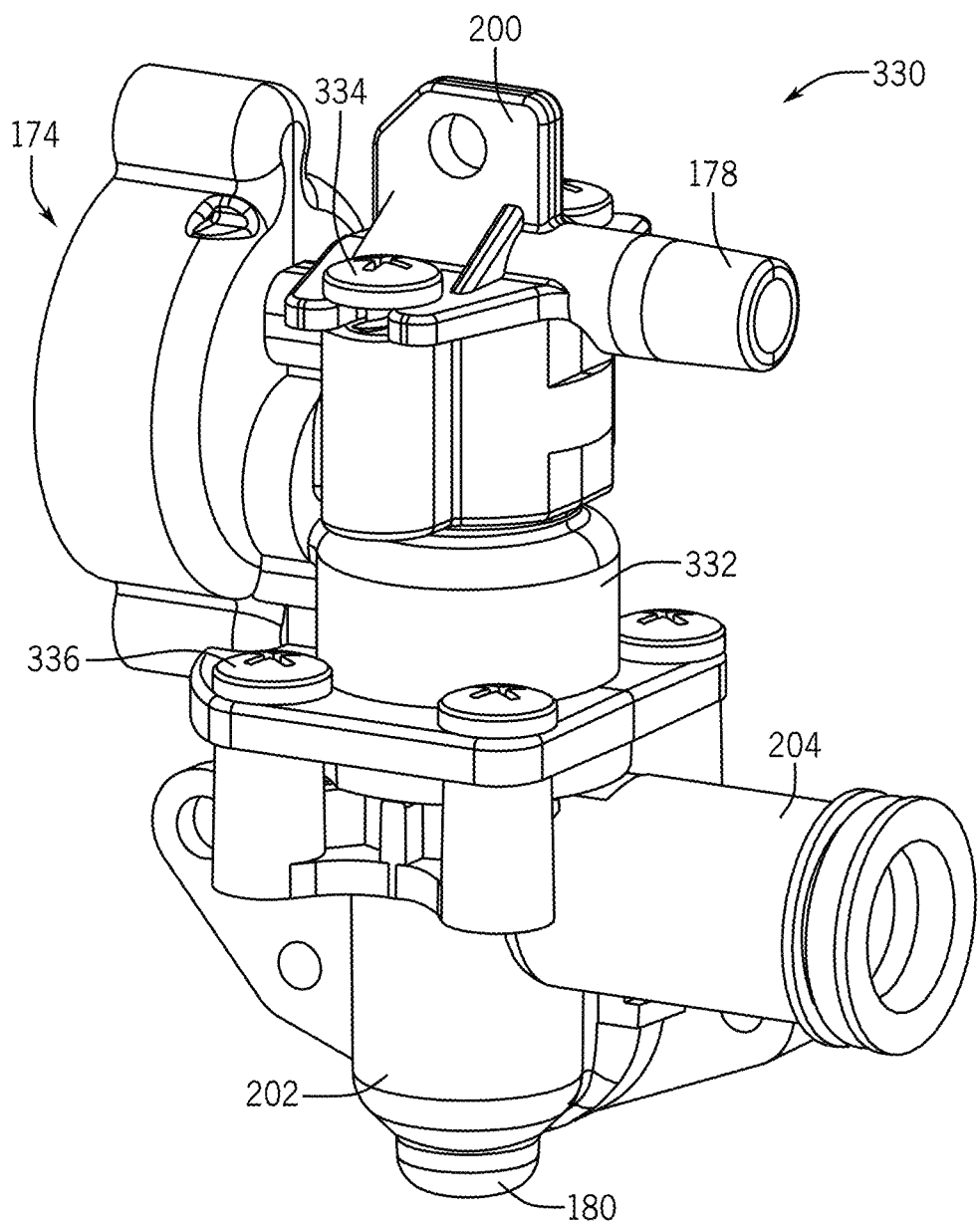
FIG. 10 illustrates a perspective view of an additional pump assembly in accordance with an embodiment of the disclosure.
Figure 11:
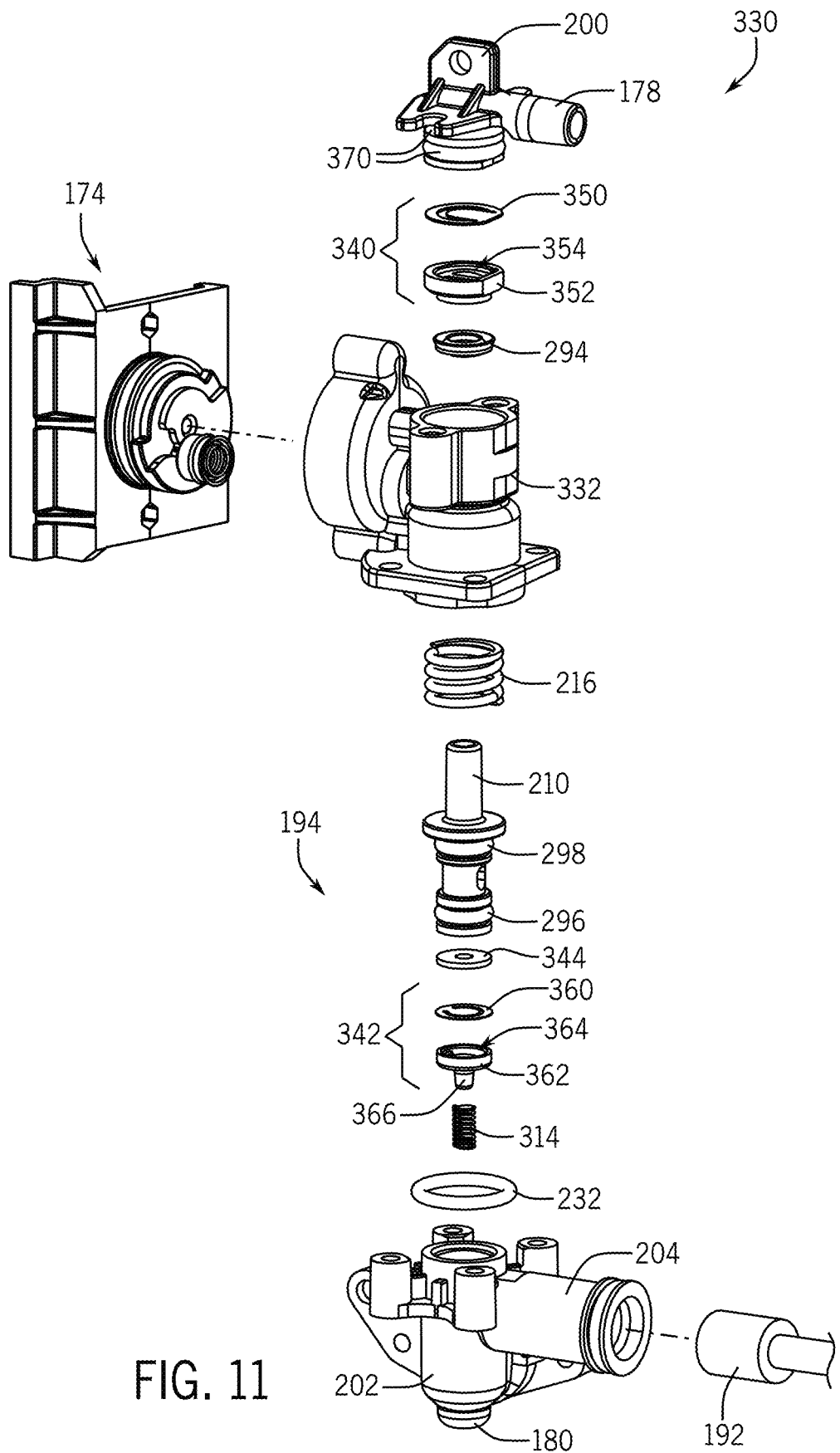
FIG. 11 illustrates an exploded view of the pump assembly of FIG. 10 in accordance with an embodiment of the disclosure.

FIG. 10 illustrates a perspective view of an additional pump assembly 330 in accordance with an embodiment of the disclosure. FIG. 11 illustrates an exploded view of the pump assembly 330. Except as otherwise noted below, the pump assembly 330 may be similar to the pump assembly 170 of FIGS. 3-8 and/or the pump assembly 320 of FIG. 9. Accordingly, descriptions of like features may be omitted for clarity. Also, like reference numerals may be used to identify like elements.

Referring to FIGS. 10 and 11, the pump assembly 330 includes first pump body 200 having inlet 178 and second pump body 202 having outlet 180 and piston housing 204. As shown, the pump assembly 330 also includes a third pump body 332 connected between the first pump body 200 and the second pump body 202. For example, the first pump body 200 may be connected to the third pump body 332 via one or more first fasteners 334, and the second pump body 202 may be connected to the third pump body 332 via one or more second fasteners 336. The third pump body 332 may be configured to receive or at least partially define the pressure adjustment assembly 174.

Referring to FIG. 11, the valve assembly 194 of pump assembly 330 may include bypass valve 210, spring 216, and spring 314, described above. In some embodiments, the pump assembly 330 may include a first valve assembly 340 positioned above the bypass valve 210 near the inlet 178 and a second valve assembly 342 positioned below the bypass valve 210 near the outlet 180. The first valve assembly 340 may be fixed or held in position within the pump assembly 330. The second valve assembly 342 may be held in contact with the bypass valve 210 as the bypass valve 210 moves within the pump assembly 330 between its first position and second position. For example, the spring 314 may bias the second valve assembly 342 against the bypass valve 210, such as in a manner similar to that described above with respect to ball 312. In some embodiments, the second valve assembly 342 may be attached, bonded, or otherwise connected to the end surface 272 of the bypass valve 210. In some embodiments, the second valve assembly 342 may be formed or defined in the bypass valve 210. As shown, the pump assembly 330 may include a washer 344 positioned between the bypass valve 210 and the second valve assembly 342. The washer 344, which may be formed from rubber or other suitable material, may help form a better seal between the bypass valve 210 and the second valve assembly 342.

The first valve assembly 340 and the second valve assembly 342 may be configured to control fluid flow through the pump assembly 330. For example, the first valve assembly 340 may be configured to control fluid flow from the inlet 178 similar to the inlet valve 212 described above. Similarly, the second valve assembly 342 may be configured to control fluid flow through the outlet 180 similar to the one-way flow assembly 220 described above. For instance, each of the first valve assembly 340 and the second valve assembly 342 may form a one-way valve that controls fluid flow through the pump assembly 330.

The first valve assembly 340, which may be referred to as a first valve, an inlet valve, or an inlet valve assembly, may include many configurations. For example, the first valve assembly 340 may include a first reed valve 350 and a first retainer 352. The first reed valve 350 may be positioned against the first pump body 200 to selectively seal the chamber inlet 288 and provide one-way flow into the fluid chamber 230. For instance, the first reed valve 350 may move between an open position and a closed position. In the open position, the first reed valve 350 may allow fluid to flow into the fluid chamber 230 from the fluid inlet 178 through the chamber inlet 288 during a vacuum stroke of the piston 192. In the closed position, the first reed valve 350 may limit or prevent back flow from the fluid chamber 230 to the fluid inlet 178 through the chamber inlet 288 during a compression stroke of the piston 192, as explained below.

The first retainer 352 may hold the first reed valve 350 in place. For example, the first retainer 352 may secure or position the first reed valve 350 against the first pump body 200. In addition, the first retainer 352 may limit or prevent the first reed valve 350 from overextending. For example, the first retainer 352 may include one or more structures (e.g., bars, surfaces, etc.) that limit extension of the first reed valve 350 beyond a threshold. As shown, the first retainer 352 may include one or more holes 354 that allow fluid to flow through the first retainer 352.

The second valve assembly 342, which may be referred to as a second valve, an outlet valve, or an outlet valve assembly, may include many configurations. In some embodiments, the second valve assembly 342 may be similar to the first valve assembly 340. For example, the second valve assembly 342 may include a second reed valve 360 and a second retainer 362. The second reed valve 360 may be positioned against the bypass valve 210 and/or the washer 344 to selectively seal the longitudinal bore 262 of the bypass valve 210 and provide one-way flow into the fluid chamber 230. For instance, the second reed valve 360 may move between an open position and a closed position. In the open position, the second reed valve 360 may allow fluid to flow into the fourth fluid chamber 308 during a compression stroke of the piston 192. In the closed position, the second reed valve 360 may limit or prevent back flow from the fourth fluid chamber 308 during a vacuum stroke of the piston 192, as explained below. In some embodiments, the second reed valve 360 may be positioned against the washer 344. The washer 344 may form a better seal between the second reed valve 360 and the bypass valve 210. In some embodiments, the washer 344 may be omitted. For example, the second reed valve 360 may be formed from rubber or other sealing material that would eliminate the need for the washer 344. In some embodiments, the second reed valve 360 may be bonded or otherwise secured to the bypass valve 210 and/or the washer 344.

The second retainer 362 may hold the second reed valve 360 and/or the washer 344 in place. For example, the second retainer 362 may secure or position the second reed valve 360 against the bypass valve 210 and/or against the washer 344. In addition, the second retainer 362 may limit or prevent the second reed valve 360 from overextending, such as the second retainer 362 including one or more structures (e.g., bars, surfaces, etc.) that limit extension of the second reed valve 360 beyond a threshold. As shown, the second retainer 362 may include one or more holes 364 that allow fluid to flow through the second retainer 362. In some embodiments, the second retainer 362 may include a boss 366 to which the spring 314 is connected.

Figure 12:
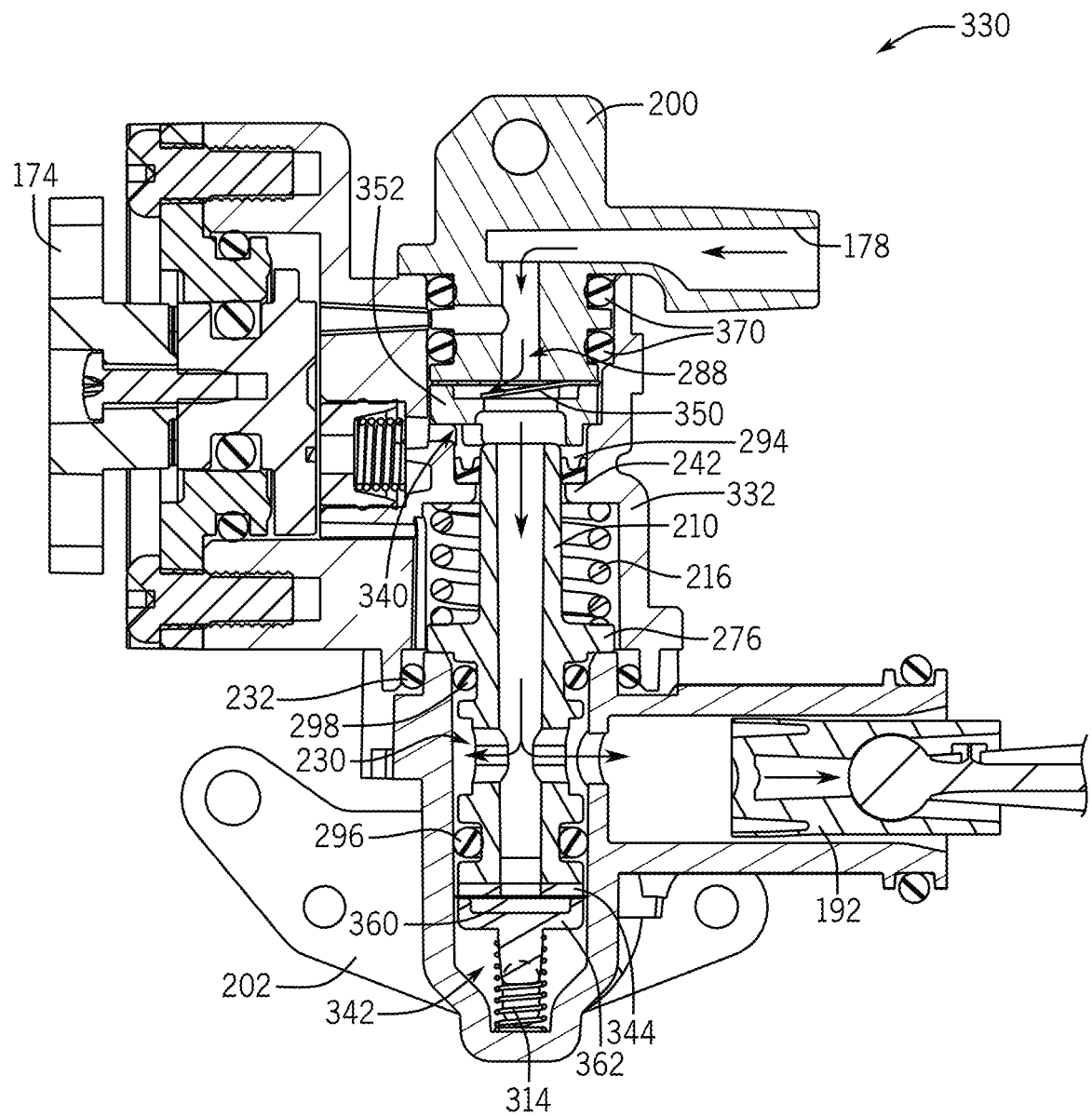
FIG. 12 illustrates a cross-sectional view of the pump assembly of FIG. 10 in a first configuration in accordance with an embodiment of the disclosure.

FIG. 12 illustrates a cross-sectional view of the pump assembly 330 in accordance with an embodiment of the disclosure. As shown, the valve chamber 230 may be defined by the first pump body 200, the second pump body 202, and the third pump body 332. Seal 232 may be positioned at the interface between the second pump body 202 and the third pump body 332 to fluidically seal the valve chamber 230 at the interface. In like manner, one or more seals 370 (e.g., two seals 370) may be positioned at the interface between the first pump body 200 and the third pump body 332 to fluidically seal the valve chamber 230 at the interface. The third pump body 332 may include shoulder 242, with the spring 216 seated against the shoulder 242 and the ledge 276 of the bypass valve 210 to bias the bypass valve 210 away from shoulder 242 and towards the second body portion 202. The first seal 294 may seal the bypass valve 210 to the third pump body 332 near the shoulder 242, with the second seal 296 and the third seal 298 sealing the bypass valve 210 to the second pump body 202. As shown, the first seal 294 may be embodied as a U-cup seal, although other configurations are contemplated.

Figure 13:
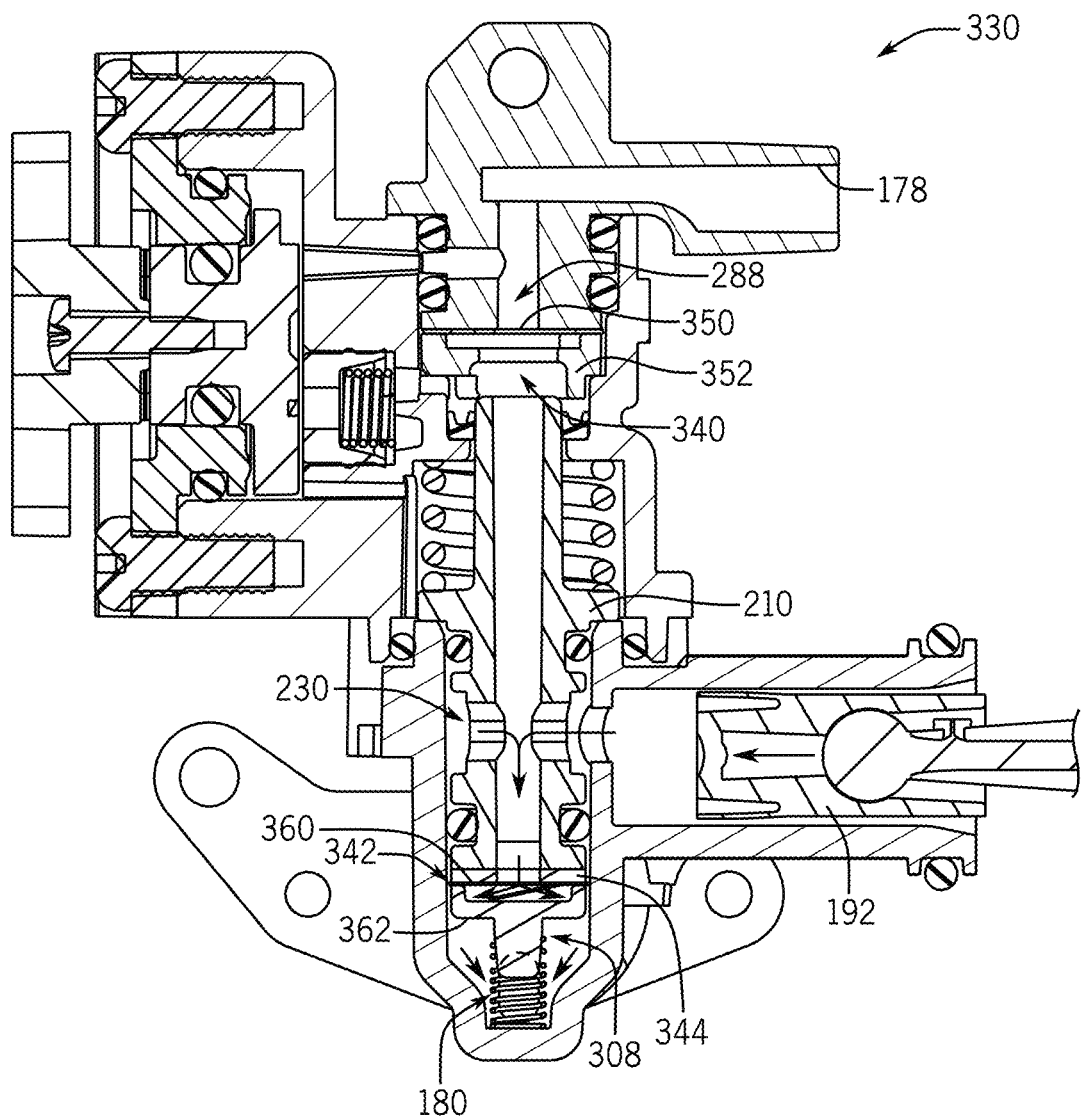
FIG. 13 illustrates a cross-sectional view of the pump assembly of FIG. 10 in a second configuration in accordance with an embodiment of the disclosure.
Figure 14:
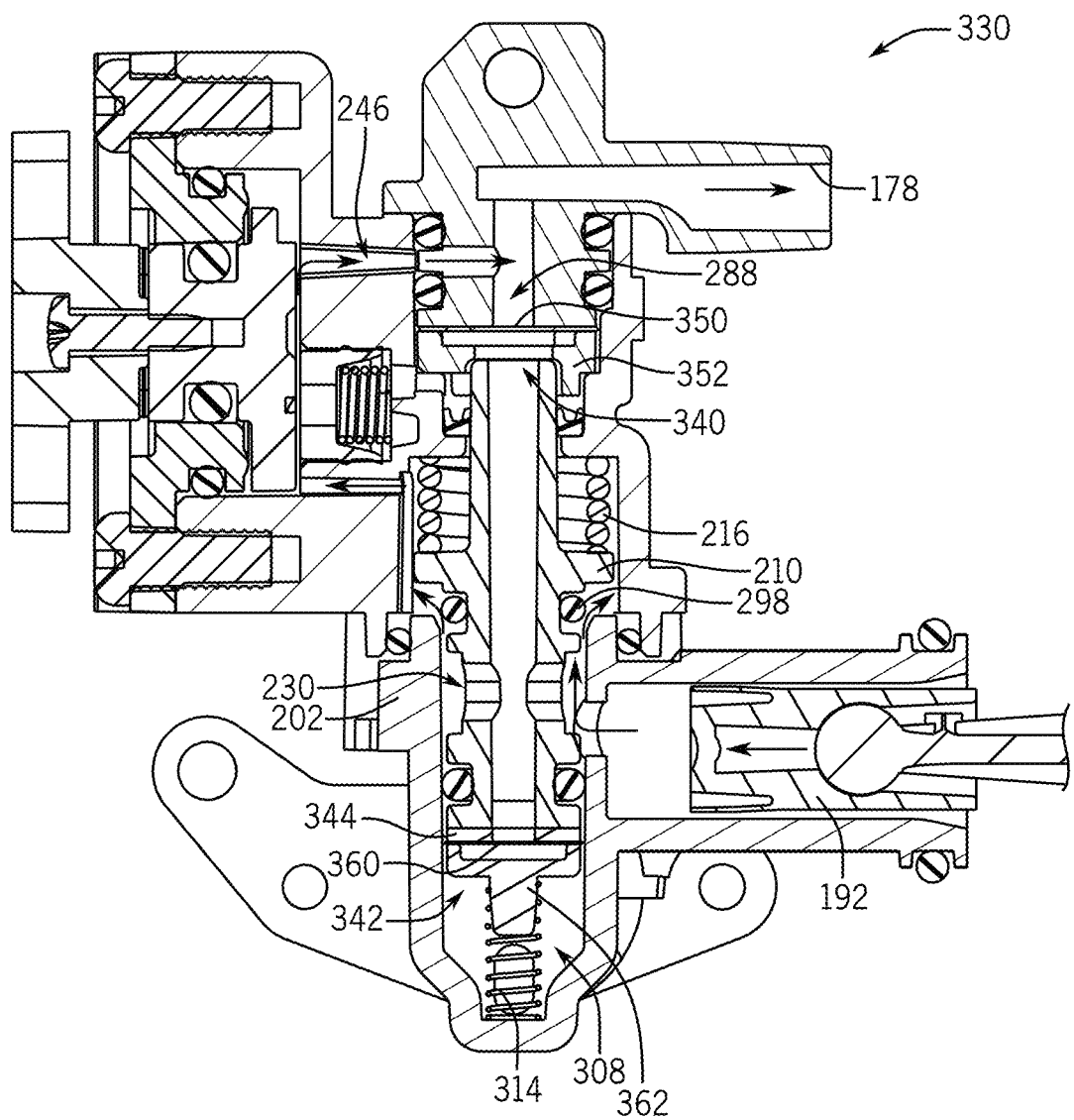
FIG. 14 illustrates a cross-sectional view of the pump assembly of FIG. 10 in a third configuration in accordance with an embodiment of the disclosure.
Figure 15:
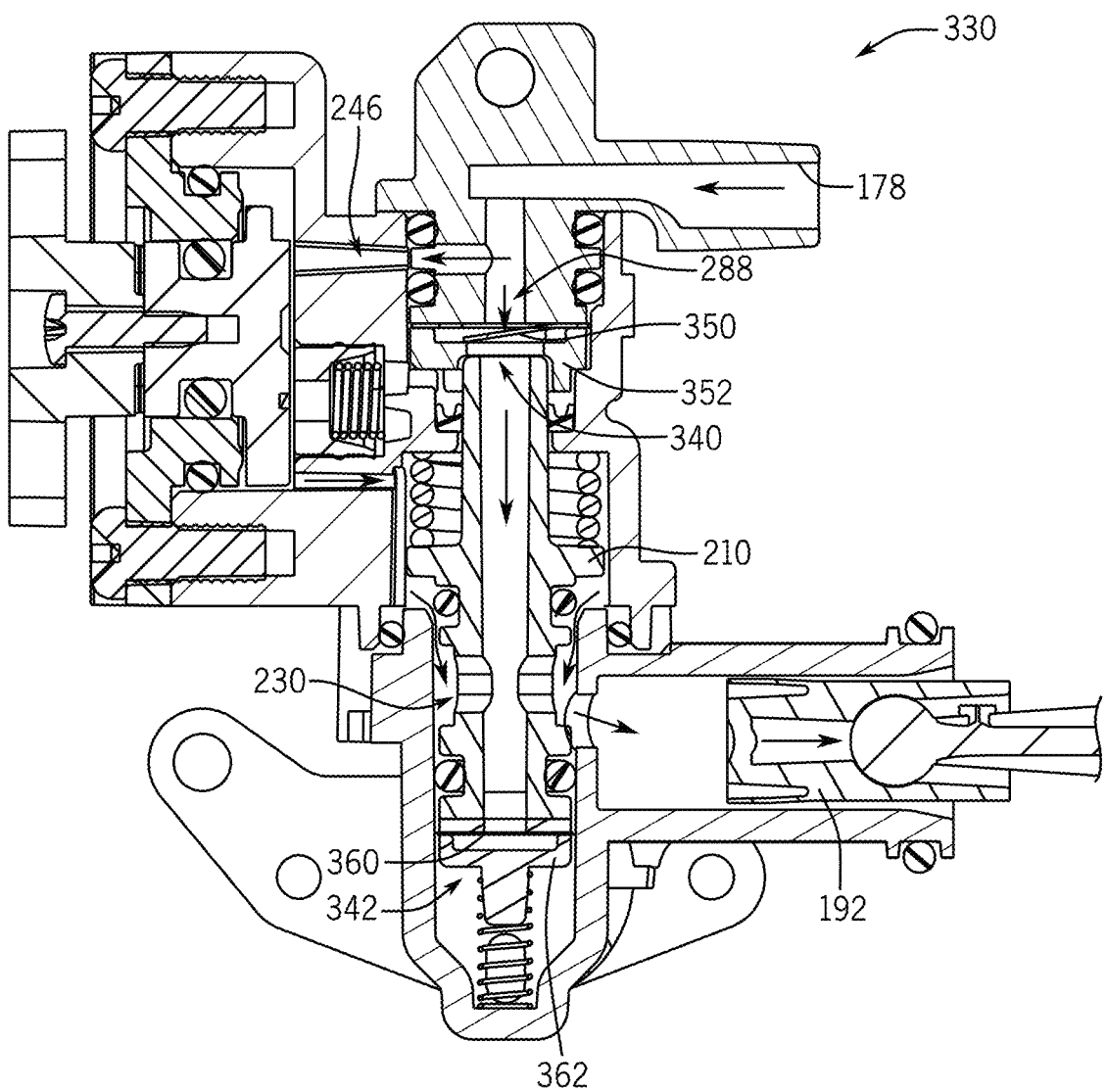
FIG. 15 illustrates a cross-sectional view of the pump assembly of FIG. 10 in a fourth configuration in accordance with an embodiment of the disclosure.

FIG. 12 illustrates a cross-sectional view of the pump assembly 330 in a first configuration in accordance with an embodiment of the disclosure. FIG. 13 illustrates a cross-sectional view of the pump assembly 330 in a second configuration in accordance with an embodiment of the disclosure. FIG. 14 illustrates a cross-sectional view of the pump assembly 330 in a third configuration in accordance with an embodiment of the disclosure. FIG. 15 illustrates a cross-sectional view of the pump assembly 330 in a fourth configuration in accordance with an embodiment of the disclosure. Referring to FIGS. 12-15, the bypass valve 210, first valve assembly 340, and second valve assembly 342 may move or change configurations to control fluid flow through the pump assembly 330. For example, FIG. 12 illustrates the bypass valve 210 in the first position, the first valve assembly 340 in the open position, and the second valve assembly 342 in the closed position during a vacuum stroke of the piston 192 when the handle 106 is open. In such configurations, the vacuum stroke of the piston 192 may draw fluid into the inlet 178 of the pump assembly 330 and into the valve chamber 230 through the first valve assembly 340. For example, the first reed valve 350 may bend or flex away from the chamber inlet 288 to allow fluid to flow past the first reed valve 350 and through the first retainer 352 into the valve chamber 230. The first reed valve 350 may bend or flex until the first reed valve 350 contacts the first retainer 352, such as to limit or prevent the first reed valve 350 from overextending. Fluid may flow through the bypass valve 210 and into the piston housing 204, similar to that described above with reference to FIG. 5.

FIG. 13 illustrates the bypass valve 210 in the first position, the first valve assembly 340 in the closed position, and the second valve assembly 342 in the open position during a compression stroke of the piston 192 when the handle 106 is open. In such configurations, increased fluid pressure may cause the first reed valve 350 to seat against the chamber inlet 288 and the second reed valve 360 to open to direct fluid past the second reed valve 360 and through the second retainer 362 into the fourth fluid chamber 308 and out the outlet 180 of the pump assembly 330 towards the handle 106. The second reed valve 360 may bend or flex until the second reed valve 360 contacts the second retainer 362, such as to limit or prevent overextending of the second reed valve 360.

The piston 192 may reciprocate during sustained oral irrigation operation, alternating between the vacuum stroke and the compression stroke. As the piston 192 alternates between the vacuum stroke and the compression stroke, each of the first valve assembly 340 and the second valve assembly 342 may move between open and closed positions to draw fluid into the valve chamber 230 from the inlet 178 during the vacuum stroke of the piston 192 and expel fluid out the outlet 180 during the compression stroke of the piston 192. Similar to pump assembly 170 described above, the bypass valve 210 may remain stationary in the first position when the handle 106 is open for oral irrigation.

FIG. 14 illustrates the bypass valve 210 in the second position, the first valve assembly 340 in the closed position, and the second valve assembly 342 in the closed position during a compression stroke of the piston 192 when the handle 106 is closed or paused. When the handle 106 is closed, fluid pressure within the valve chamber 230 may build up until the fluid pressure against the third seal 298 is sufficient to overcome the force of spring 216 biasing the bypass valve 210 to the first position, causing the bypass valve 210 to move to the second position and disengaging the third seal 298 from the second pump body 202. When the handle 106 is closed, fluid may stop flowing through the hose 108. On the next compression stroke of the piston 192, the pressure created in valve chamber 230 may act on the third seal 298 and move the bypass valve 210 to the second position. When the bypass valve 210 moves to the second position, fluid may also flow through the second valve assembly 342 to make up the increased volume in the fourth fluid chamber 308 until the handle 106 is opened. The fluid trapped in the fourth fluid chamber 308 may keep the bypass valve 210 in the second position. A constant or near constant fluid pressure may be maintained in the fourth fluid chamber 308 by spring 216 acting through bypass valve 210 to keep the second valve assembly 342 closed during both the compression stroke and the vacuum stroke of piston 192 while the handle 106 is closed.

In some embodiments, the bypass valve 210 may seat within or against the first retainer 352 when the bypass valve 210 moves to the second position. As a result, the second stop may be defined by the first retainer 352. In some embodiments, the second stop may be defined by full compression of the spring 216. Increased fluid pressure within the valve chamber 230 may also cause the first reed valve 350 to seat against the chamber inlet 288, causing fluid to flow through the bypass flow circuit 246 for circulation back to the reservoir, such as in the manner described above.

Similar to one-way flow assembly 220 described above, the second valve assembly 342 may maintain engagement with the bypass valve 210 as the bypass valve 210 moves between the first position and the second position, such as via spring pressure from spring 314, for example. As a result, fluid pressure within the fourth fluid chamber 308 may be maintained until flow through the handle 106 is resumed.

FIG. 15 illustrates the bypass valve 210 in the second position, the first valve assembly 340 in the open position, and the second valve assembly 342 in the closed position during a vacuum stroke of the piston 192 when the handle 106 is closed or paused. In such configurations, fluid from the inlet 178 may be drawn into the valve chamber 230 similar to that described above with reference to FIG. 12, such as through the chamber inlet 288 and through the first valve assembly 340. In addition, fluid may flow through the bypass flow circuit 246 in the configuration illustrated in FIG. 15, similar to that described above with reference to FIG. 8.

The piston 192 may reciprocate during sustained operation while the handle 106 is closed or paused. As the piston 192 alternates between the vacuum stroke and the compression stroke, the first valve assembly 340 may move between open and closed positions, similar to sustained oral irrigation operation. The bypass valve 210 may remain stationary in the second position when the handle 106 is closed. Similar to pump assembly 170 described above, fluid may flow through the bypass flow circuit 246 (e.g., freely or generally freely) as the piston 192 reciprocates between the vacuum stroke and the compression stroke when the handle 106 is closed.

Figure 16:
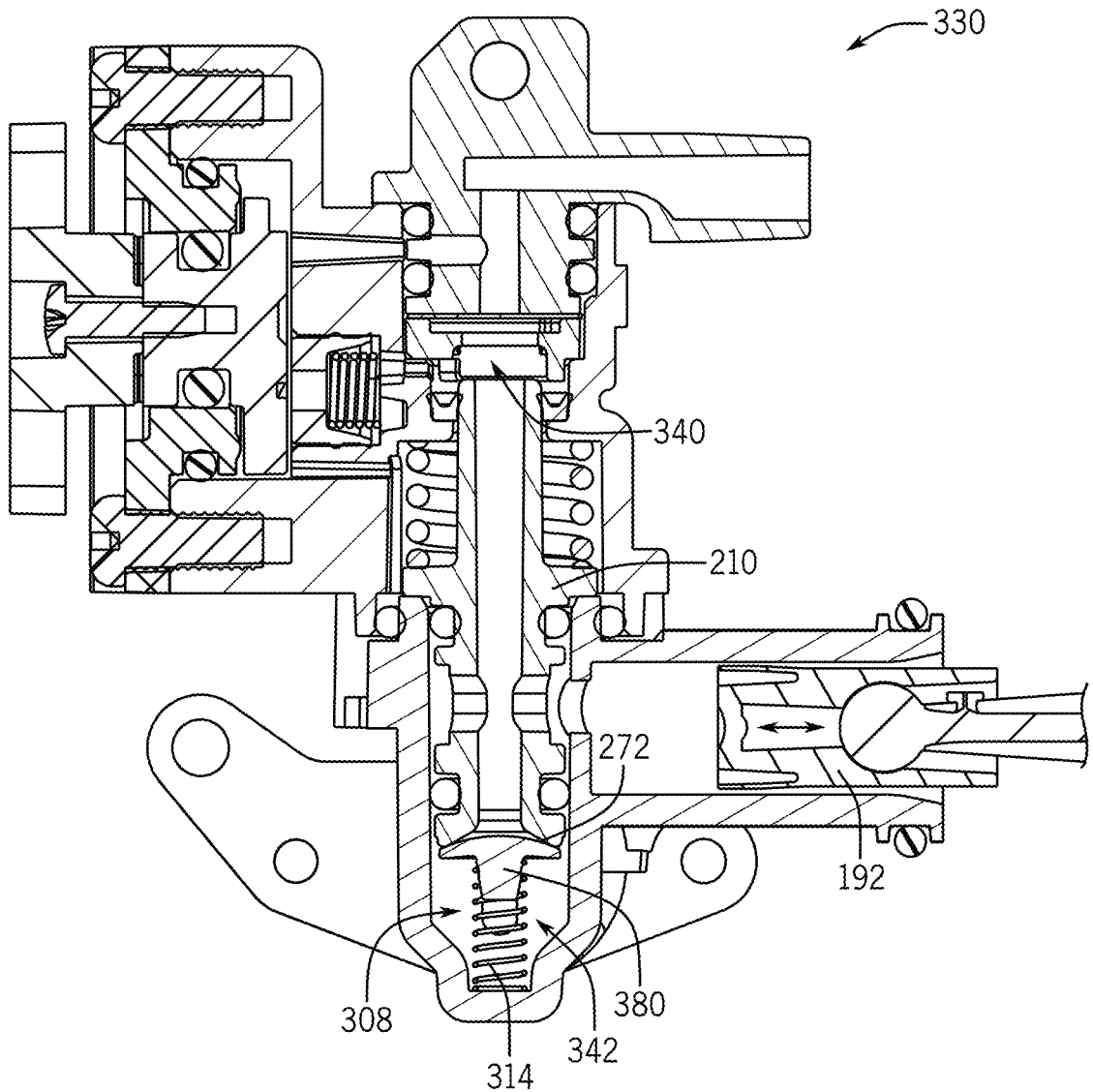
FIG. 16 illustrates a cross-sectional view of the pump assembly of FIG. 10 and showing an additional valve configuration in accordance with an embodiment of the disclosure.

The embodiments illustrated above are illustrative only, and the pump assembly 330 may include other configurations. For example, as shown in the FIG. 16, the second valve assembly 342 may be embodied as a poppet valve. As such, the second valve assembly 342 may include a poppet 380 biased by spring 314 against the end surface 272 of the bypass valve 210, such as in a manner similar to ball 312 described above. As a result, the poppet 380 may function similar to ball 312 described above, allowing fluid to flow into the fourth fluid chamber 308 but also limit reverse fluid flow out of the fourth fluid chamber 308. During a compression stroke of the piston 192 when the handle 106 is open, fluid pressure against the poppet 380 may overcome the force provided by the spring 314, causing the poppet 380 to disengage the bypass valve 210 to allow fluid to flow around poppet 380 and into the fourth fluid chamber 308. Once the pressure within the fourth fluid chamber 308 subsides or is released, the spring 314 may bias the poppet 380 against the bypass valve 210 to seal the fourth fluid chamber 308 and limit reverse flow of fluid from the fourth fluid chamber 308. The poppet 380 may seal on the outer edge of the bypass valve 210 to maximize the surface area of the poppet 380 in contact with the fluid pressure. Such configurations may improve flow rate by, for example, minimize a cracking pressure required to disengage the poppet 380 from the bypass valve 210.

Figure 17:
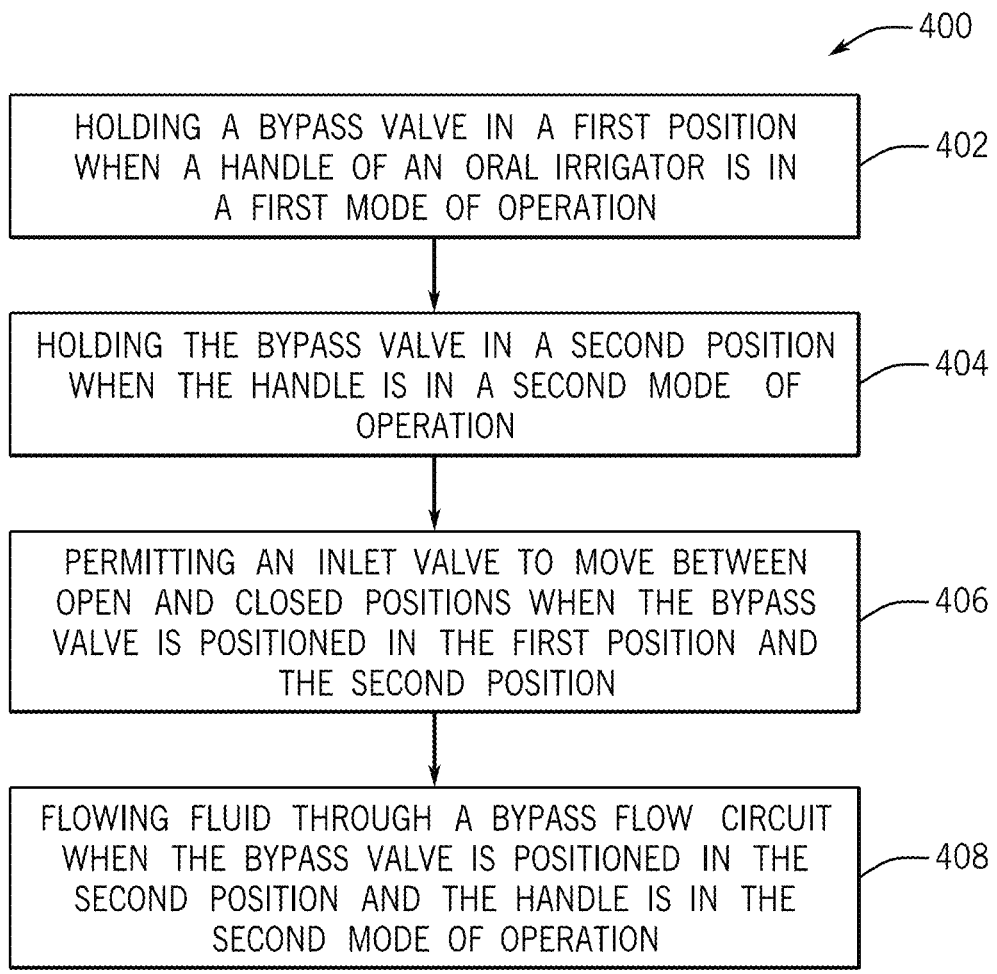
FIG. 17 illustrates a diagram of a process of controlling fluid flow through an oral irrigator in accordance with an embodiment of the disclosure.

FIG. 17 illustrates a diagram of a process 400 of controlling fluid flow through an oral irrigator in accordance with an embodiment of the disclosure. It should be appreciated that any step, sub-step, sub-process, or block of process 400 may be performed in an order or arrangement different from the embodiments illustrated by FIG. 17. For example, one or more blocks may be omitted from or added to the process 400. Although process 400 is described with reference to the embodiments of FIGS. 1-16, process 400 may be applied to other embodiments.

The oral irrigator associated with process 400 may be similar to oral irrigator 100 described above. For example, the oral irrigator may include a fluid reservoir, a handle, a pump assembly, a piston and motor, and a valve assembly. The valve assembly may be similar to valve assembly 194 described above, such as including a bypass valve movable between first and second positions and one or more valves or valve assemblies, such as an inlet valve and/or an outlet valve, movable between open and closed positions to control fluid flow through the pump assembly.

In Block 402, process 400 includes holding the bypass valve in the first position when the handle is in a first mode of operation. For example, Block 402 may include holding the bypass valve against a first stop using a spring. The first mode of operation may be an irrigating mode of the handle permitting fluid flow through the handle for oral irrigation of a user's mouth. The first stop may be defined by a portion of the pump assembly, such as defined by a portion of a pump body. In such embodiments, a portion of the bypass valve may be held against the pump body via a spring. The spring rate may be sufficient such that the bypass valve remains in the first position (e.g., held against the pump body) during the first mode of operation. For instance, the spring rate may be sufficient such that fluid pressure within the pump assembly during oral irrigation does not move the bypass valve from the first position.

In Block 404, process 400 includes holding the bypass valve in the second position when the handle is in a second mode of operation. For example, Block 404 may include holding the bypass valve against a second stop using fluid pressure. The second stop may be defined by another portion of the pump body or the inlet valve. In some embodiments, the second stop may be defined by a spring cap or the second stop may be defined by full compression of the spring. The second mode of operation may be a pause mode of the handle limiting fluid flow through the handle. When fluid flow is stopped through the handle, fluid pressure may build up within the outlet of the pump assembly. This built up fluid pressure within the outlet may cause the bypass valve to move from the first position to the second position as the fluid pressure acts against an end surface of the bypass valve. Specifically, when the fluid pressure builds up within the outlet, the fluid pressure acting against the bypass valve may overcome the spring biasing the bypass valve to the first position. Once the fluid pressure overcomes the spring and moves the bypass valve to the second position, the bypass valve may remain at the second position until the handle is placed again in the first mode of operation.

In Block 406, process 400 includes permitting the inlet valve to move between the open and closed positions when the bypass valve is positioned in the first position and the second position. For example, irrespective of the position of the bypass valve, the inlet valve may move between the open and closed positions with reciprocating movement of the piston. In the open position, the inlet valve may permit fluid to be drawn into the valve assembly from a fluid reservoir under a vacuum stroke of the piston. In the closed position, the inlet valve may limit or restrict reverse fluid flow to the fluid reservoir under a compression stroke of the piston.

In Block 408, process 400 may include flowing fluid through a bypass flow circuit when the bypass valve is positioned in the second position and the handle is in the second mode of operation. For example, to prevent over-pressuring the pump assembly when the handle is closed, the pump assembly may include a bypass flow circuit allowing fluid to circulate back to the fluid reservoir under a compression stroke of the piston. In such embodiments, access to the bypass flow circuit may be available only when the bypass valve is in the second position. For instance, when the bypass valve is in the first position, the valve chamber may be sealed off from the bypass flow circuit by a seal. In such embodiments, Block 408 may include disengaging the seal between the bypass valve and a valve chamber when the bypass valve moves to the second position. Once the seal is disengaged, fluid may be directed from the valve chamber to the bypass flow circuit, such as in a manner described above.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An oral irrigator comprising:
   a handle positionable between a first mode and a second mode, the first mode being an operation mode of the handle, the second mode being a pause mode of the handle; and
   a valve assembly comprising:
      a bypass valve movable between first and second positions, the bypass valve comprises:
         a hollow rod section, the hollow rod section comprising one or more bores defined therethrough to direct fluid;
         a ledge extending annularly from the hollow rod section; and
      an inlet valve movable between open and closed positions, wherein the first position of the bypass valve is associated with the first mode of the handle and the second position of the bypass valve is associated with the second mode of the handle, such that the bypass valve moves from the first position to the second position when the handle is positioned in the second mode and remains in the second position until the handle is positioned in the first mode, and wherein the inlet valve moves between an open and closed positions when the bypass valve is positioned in the first position and the second position; and
      a spring biasing the ledge against a first stop to define the first position, wherein a fluid pressure buildup overcomes the spring to hold the bypass valve in the second position against a second stop.

2. The oral irrigator of claim 1, further comprising:
   an outlet valve movable between open and closed positions;
   wherein the inlet valve comprises a first reed valve; and
   wherein the outlet valve comprises a second reed valve or a poppet valve.

3. The oral irrigator of claim 1, wherein the inlet valve moves between the open and closed positions while the bypass valve remains stationary in either the first position or the second position.

4. The oral irrigator of claim 1, further comprising a pump assembly, the pump assembly comprising:
   an inlet;
   an outlet;
   a valve chamber fluidically connecting the inlet to the outlet, the bypass valve movably positioned within the valve chamber; and
   a bypass flow circuit fluidically connecting the valve chamber to the inlet to direct fluid between the valve chamber and the inlet based on the position of the bypass valve within the valve chamber, wherein the first position of the bypass valve limits fluid flow through the bypass flow circuit, and wherein the second position of the bypass valve permits fluid flow through the bypass flow circuit.

5. The oral irrigator of claim 4, further comprising a pressure adjustment assembly configured to adjust an output pressure at the handle, the pressure adjustment assembly integrated at least partially with the bypass flow circuit.

6. The oral irrigator of claim 1, wherein:
   the bypass valve is biased towards the first position; and
   the bypass valve is held in the second position through fluid pressure.

7. The oral irrigator of claim 1, wherein:
   the first mode permits fluid flow through the handle; and
   the second mode limits fluid flow through the handle.

8. A pump assembly for an oral irrigator, the pump assembly comprising:
   an inlet;
   an outlet;
   a bypass flow circuit; and
   a valve assembly, the valve assembly comprising:
      a bypass valve movable between a first position directing fluid between the inlet and the outlet and a second position directing fluid through the bypass flow circuit, the first position associated with an operation mode of the oral irrigator, the second position associated with a pause mode of the oral irrigator, the bypass valve comprises:
         a hollow rod section, the hollow rod section comprising one or more bores defined therethrough to direct fluid between the inlet, the outlet, and the bypass flow circuit;
         a ledge extending annularly from the hollow rod section;
      an inlet valve movable between open and closed positions when the bypass valve is positioned in the first position and the second position; and
      a spring biasing the ledge against a first stop to define the first position, wherein the pump assembly is configured such that a fluid pressure buildup within the outlet overcomes the spring to hold the bypass valve in the second position against a second stop.

9. The pump assembly of claim 8, further comprising an outlet valve positioned at or adjacent to an end of the bypass valve near the outlet, wherein the outlet valve moves with the bypass valve as the bypass valve moves between the first position and the second position.

10. The pump assembly of claim 9, wherein:
the inlet valve comprises a first reed valve; or
the outlet valve comprises a second reed valve or a poppet valve.

11. The pump assembly of claim 8, further comprising:
a first seal sealing a first portion of the bypass valve to a first surface of a valve chamber near the inlet;
a second seal sealing a second portion of the bypass valve to a second surface of the valve chamber near the outlet; and
a third seal sealing a third portion of the bypass valve to a third surface of the valve chamber between the first and second seals when the bypass valve is in the first position, wherein movement of the bypass valve from the first position to the second position disengages the third seal from the third surface to direct fluid from the valve chamber to the bypass flow circuit.

12. The pump assembly of claim 11, wherein:
the bypass flow circuit comprises a first flow channel in fluid communication with the valve chamber between the first and third seals, and a second flow channel in fluid communication with the inlet;
engagement of the third seal with the third surface limits fluid flow between the valve chamber and the inlet through the first and second flow channels of the bypass flow circuit; and
disengagement of the third seal from the third surface permits fluid flow between the valve chamber and the inlet through the first and second flow channels of the bypass flow circuit.

13. The pump assembly of claim 8, wherein the bypass valve is configured to move as a result of fluid pressure buildup within the outlet.

* * * * *